May 14, 1963 M. M. NYBORG 3,089,220
AUTOMATIC SOLDERING MACHINE
Filed Sept. 20, 1957 21 Sheets-Sheet 1

INVENTOR.
MEREDITH M. NYBORG
BY
Mellin and Hanscom
ATTORNEYS

May 14, 1963 M. M. NYBORG 3,089,220
AUTOMATIC SOLDERING MACHINE
Filed Sept. 20, 1957 21 Sheets-Sheet 2

INVENTOR.
MEREDITH M. NYBORG
BY
Mellin and Hanscom
ATTORNEYS

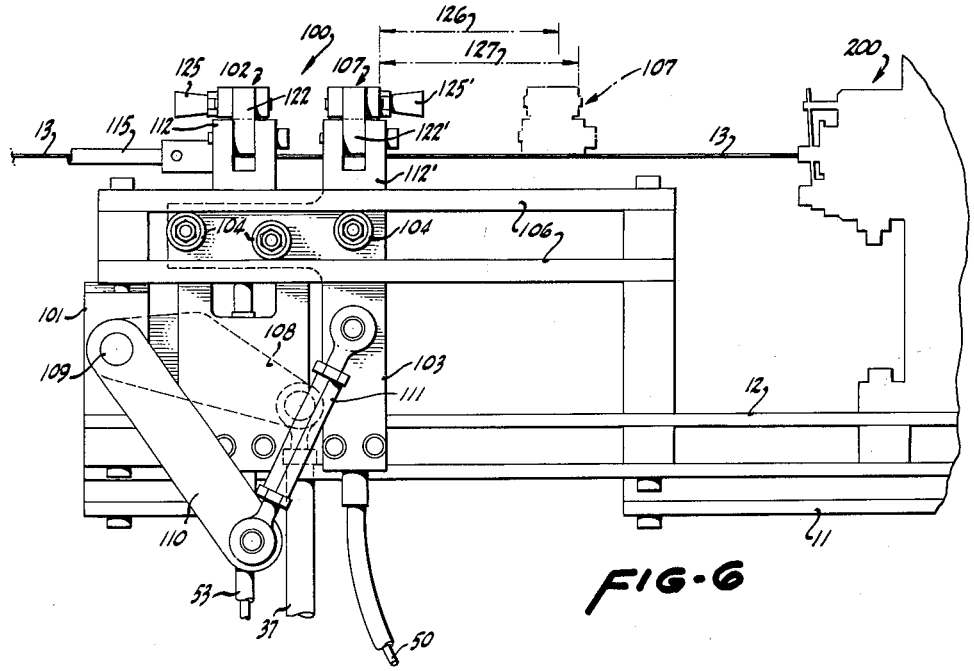
FIG-6
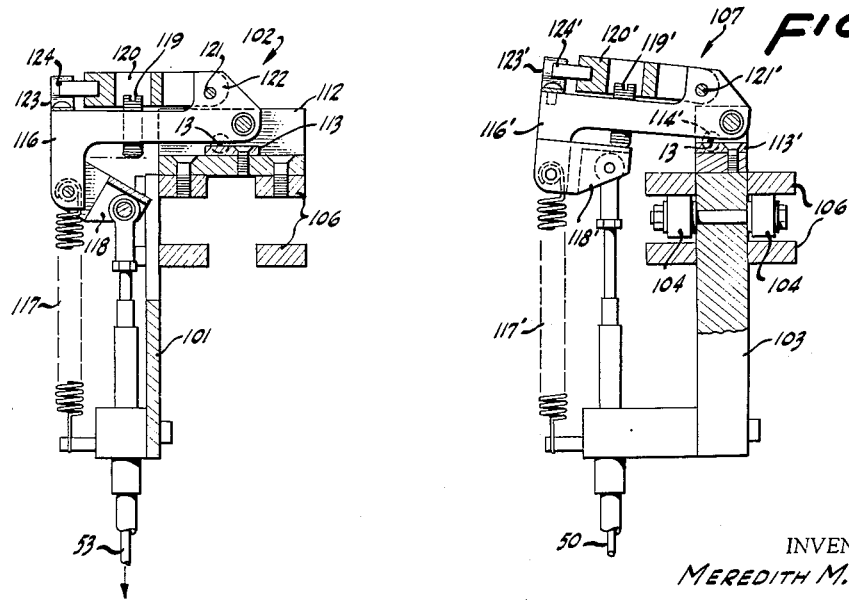
FIG-7
FIG-8

May 14, 1963 M. M. NYBORG 3,089,220
AUTOMATIC SOLDERING MACHINE
Filed Sept. 20, 1957 21 Sheets-Sheet 7

INVENTOR.
MERIDETH. M. NYBORG
BY
Mellin and Hanscom
ATTORNEYS

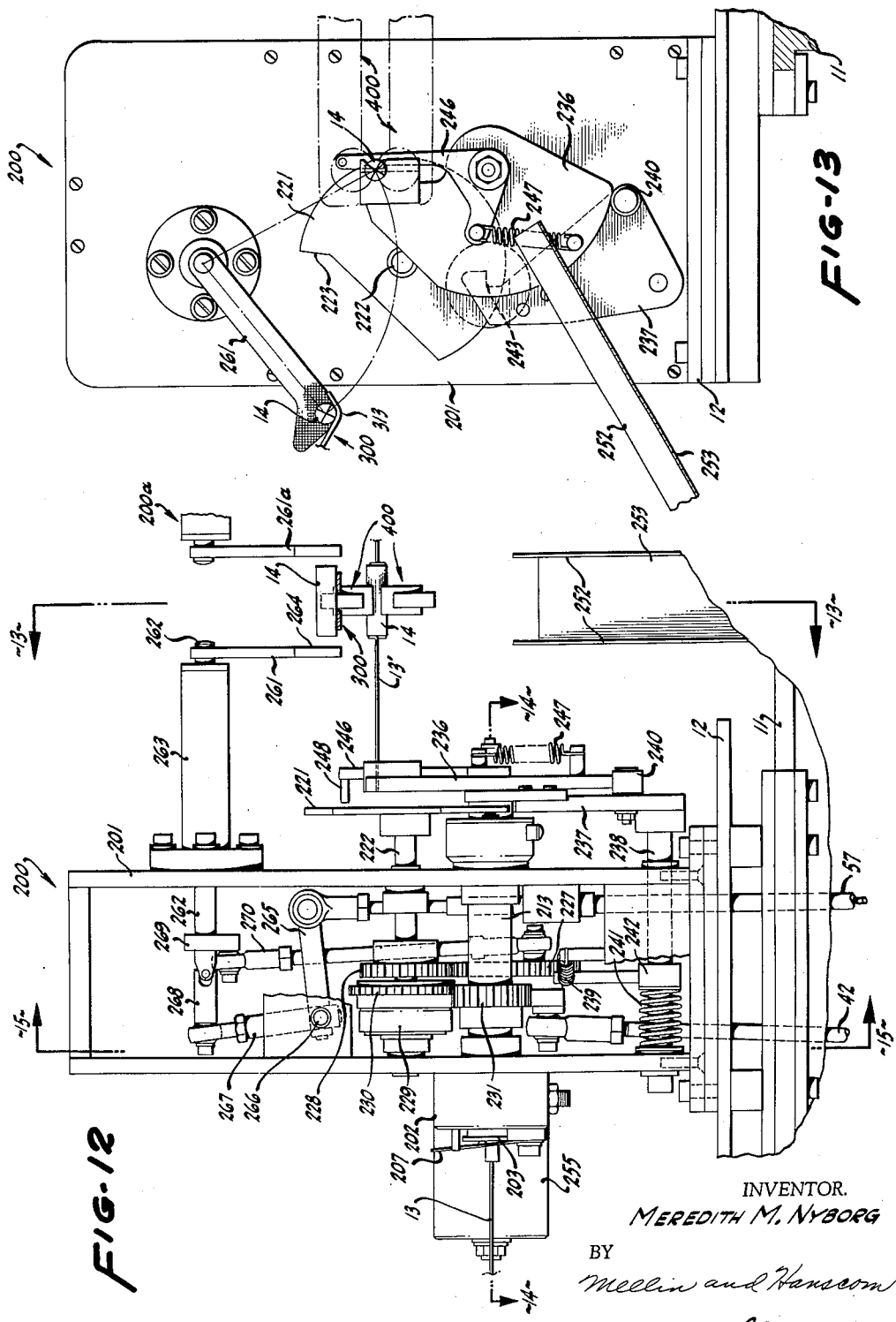

May 14, 1963 M. M. NYBORG 3,089,220
AUTOMATIC SOLDERING MACHINE
Filed Sept. 20, 1957 21 Sheets-Sheet 9
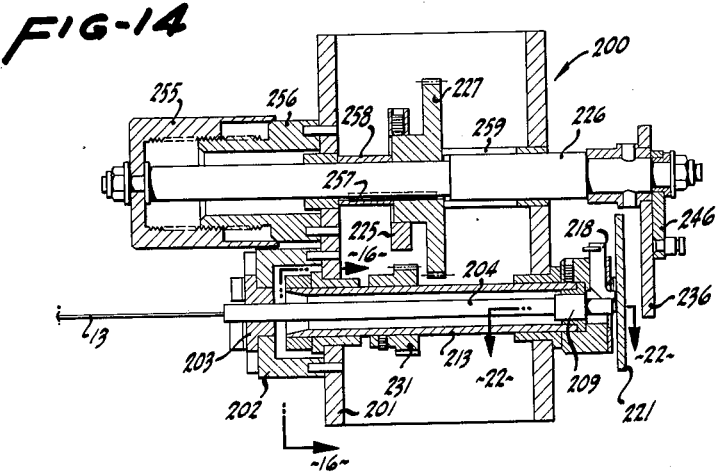
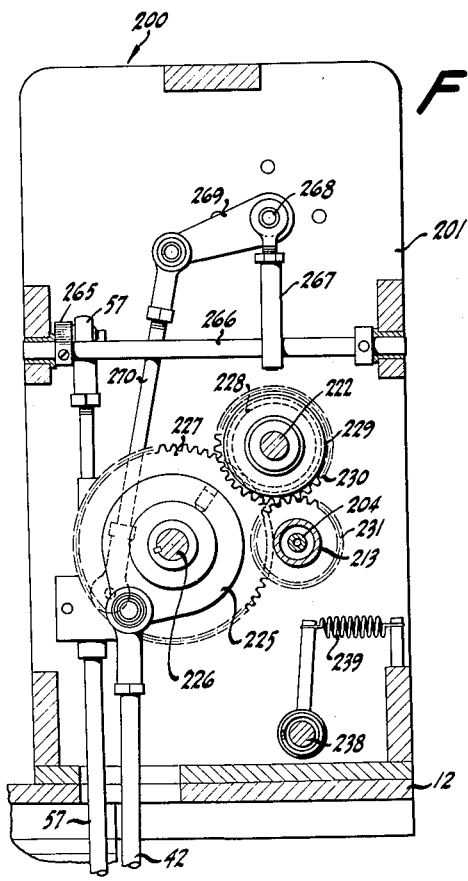
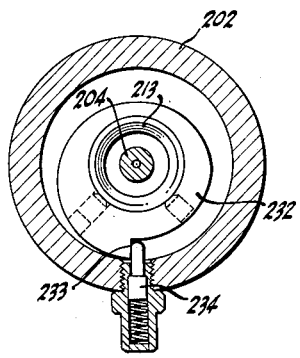
INVENTOR.
MEREDITH M. NYBORG
BY
Mellin and Hanscom
ATTORNEYS May 14, 1963 M. M. NYBORG 3,089,220
AUTOMATIC SOLDERING MACHINE
Filed Sept. 20, 1957 21 Sheets-Sheet 10
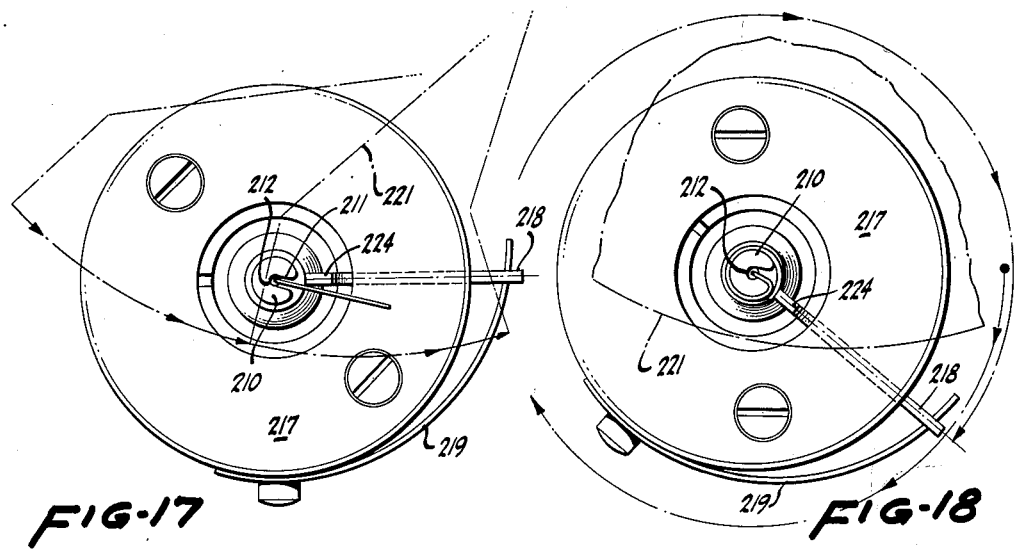
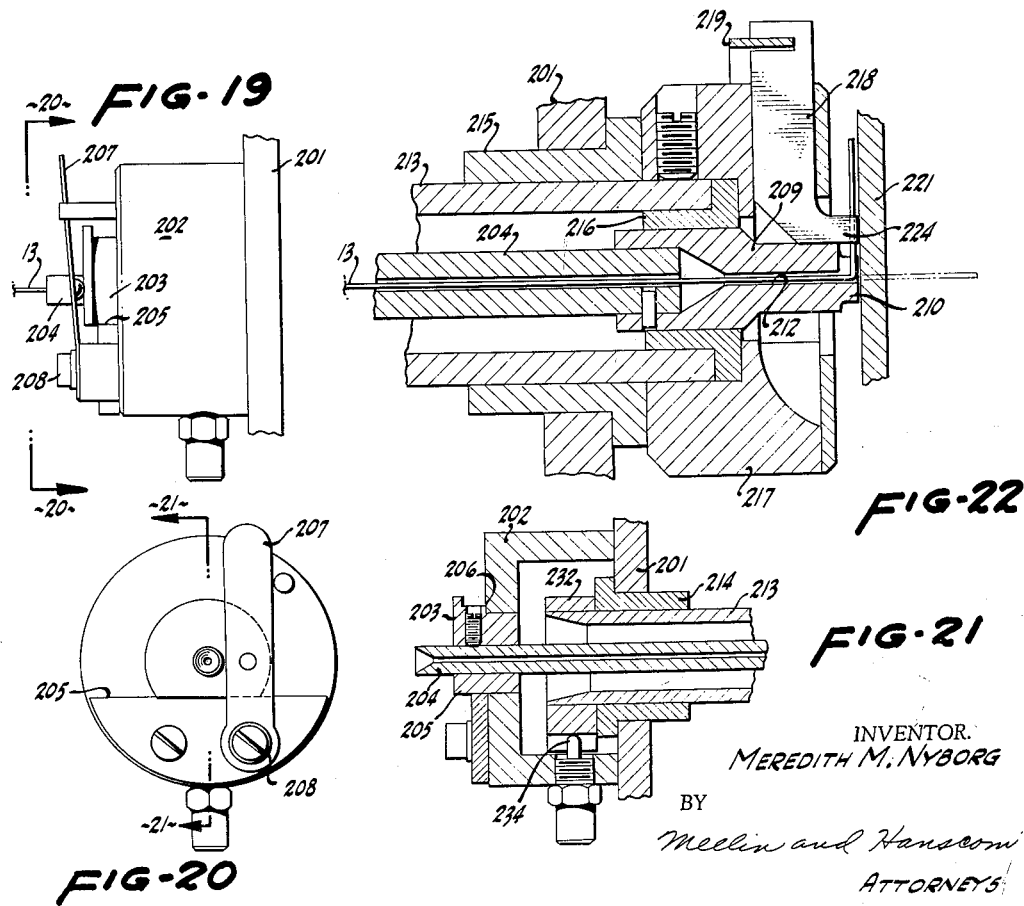
INVENTOR.
MEREDITH M. NYBORG
BY
Mellin and Hanscom
ATTORNEYS

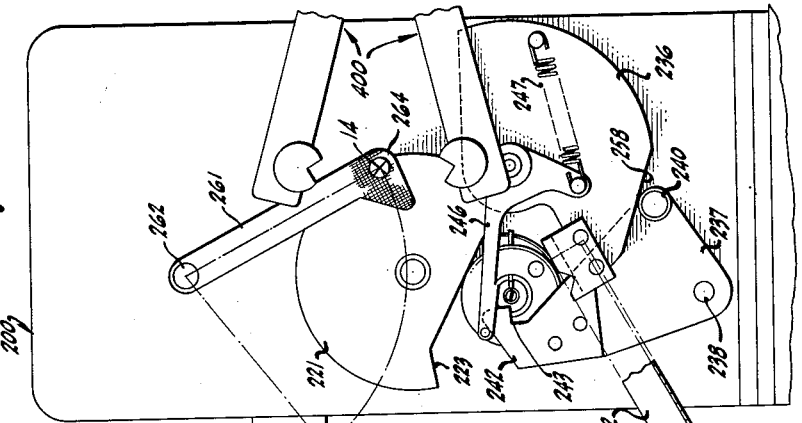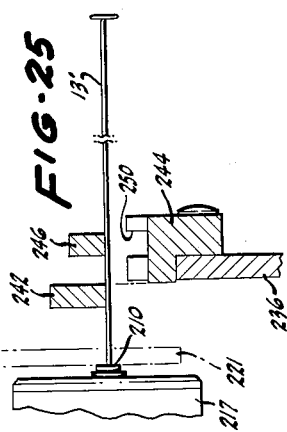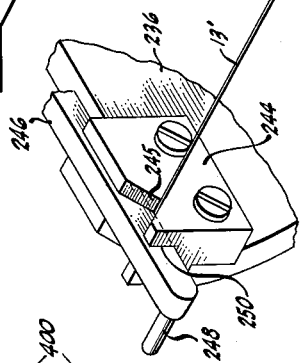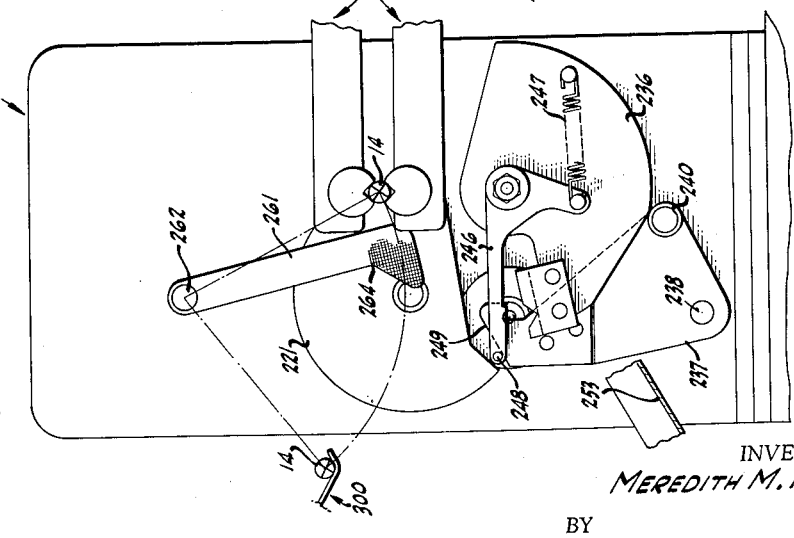

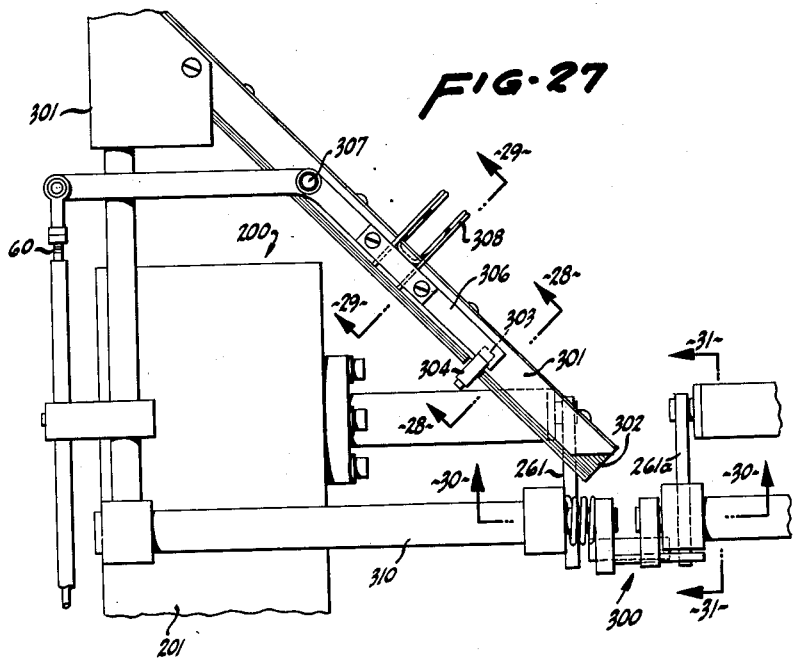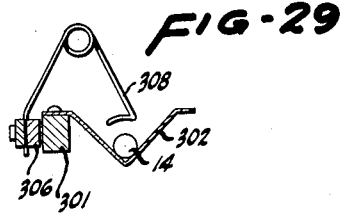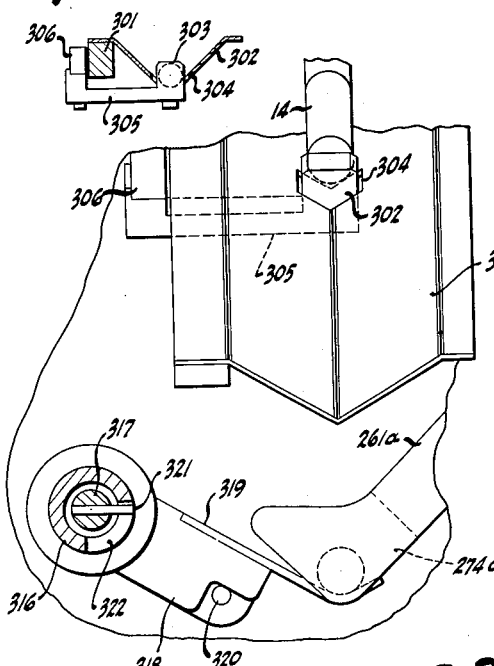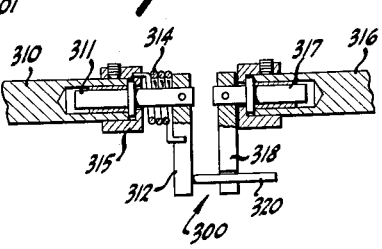

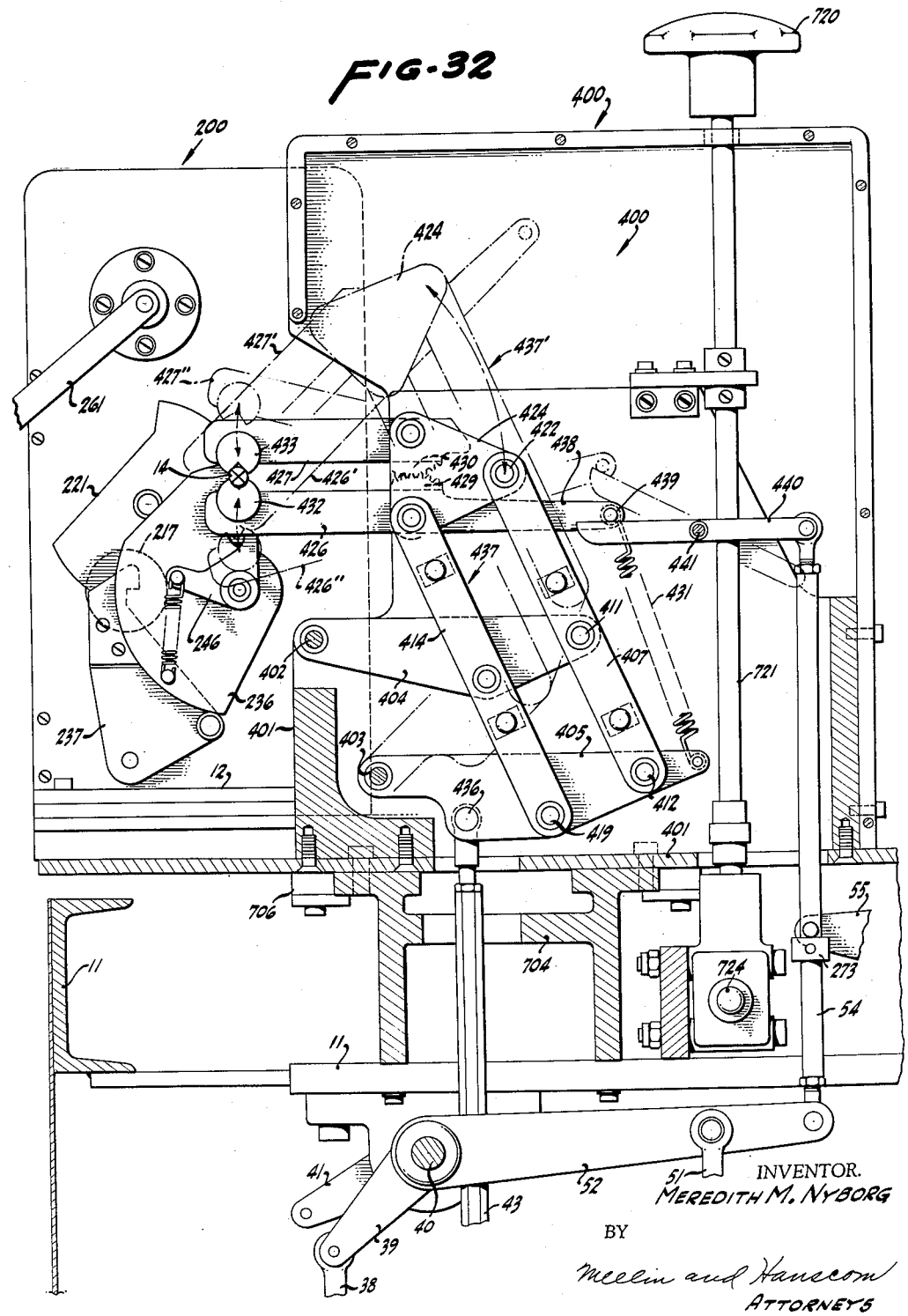

May 14, 1963   M. M. NYBORG   3,089,220
AUTOMATIC SOLDERING MACHINE
Filed Sept. 20, 1957   21 Sheets-Sheet 14
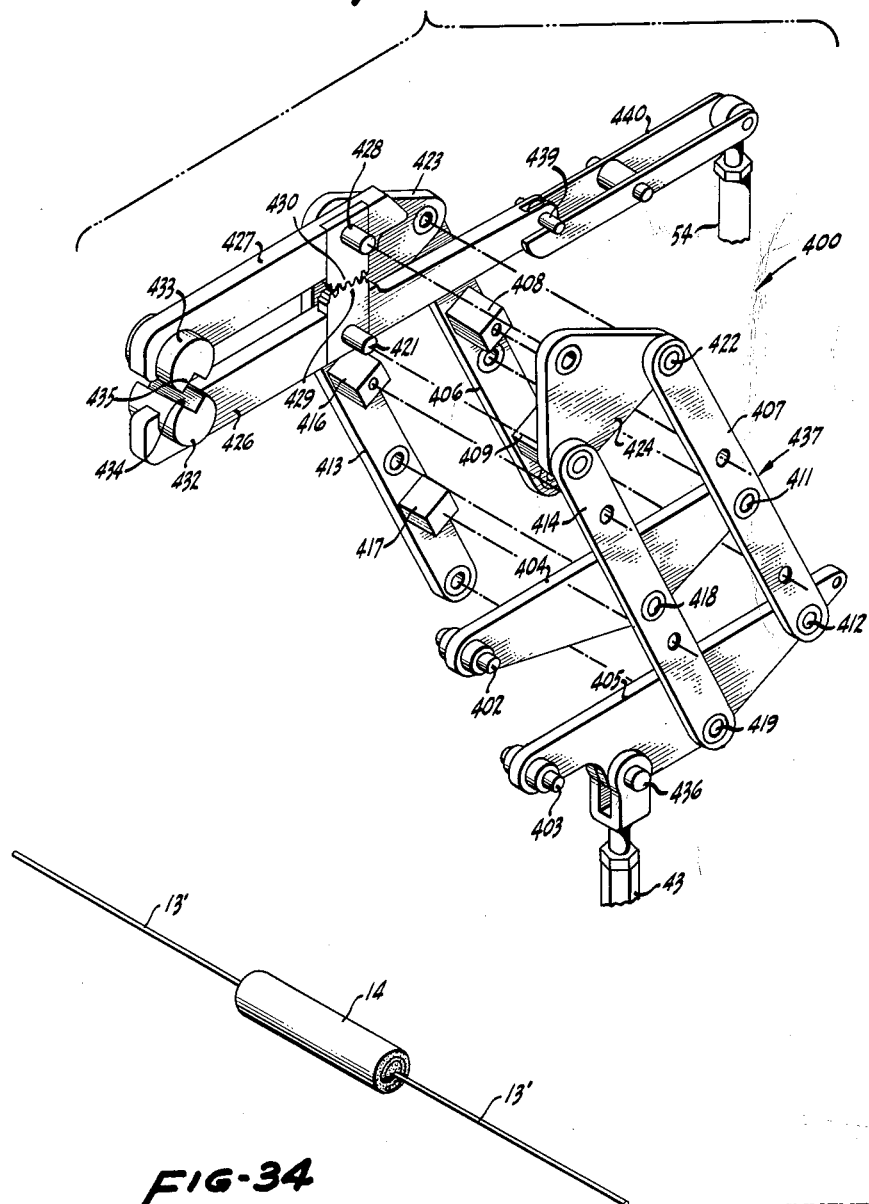
INVENTOR.
MEREDITH M. NYBORG
BY
Meelin and Hanscom
ATTORNEYS

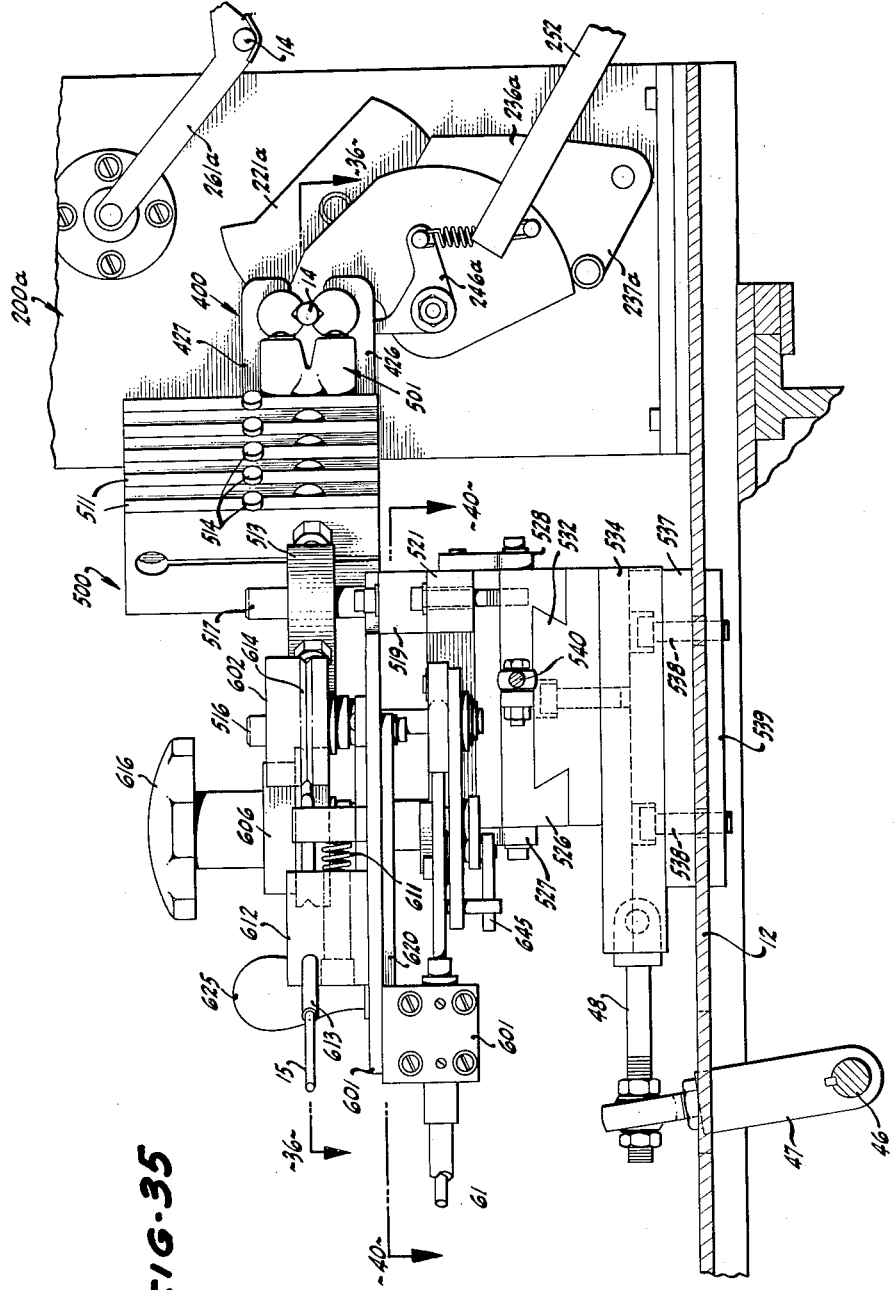

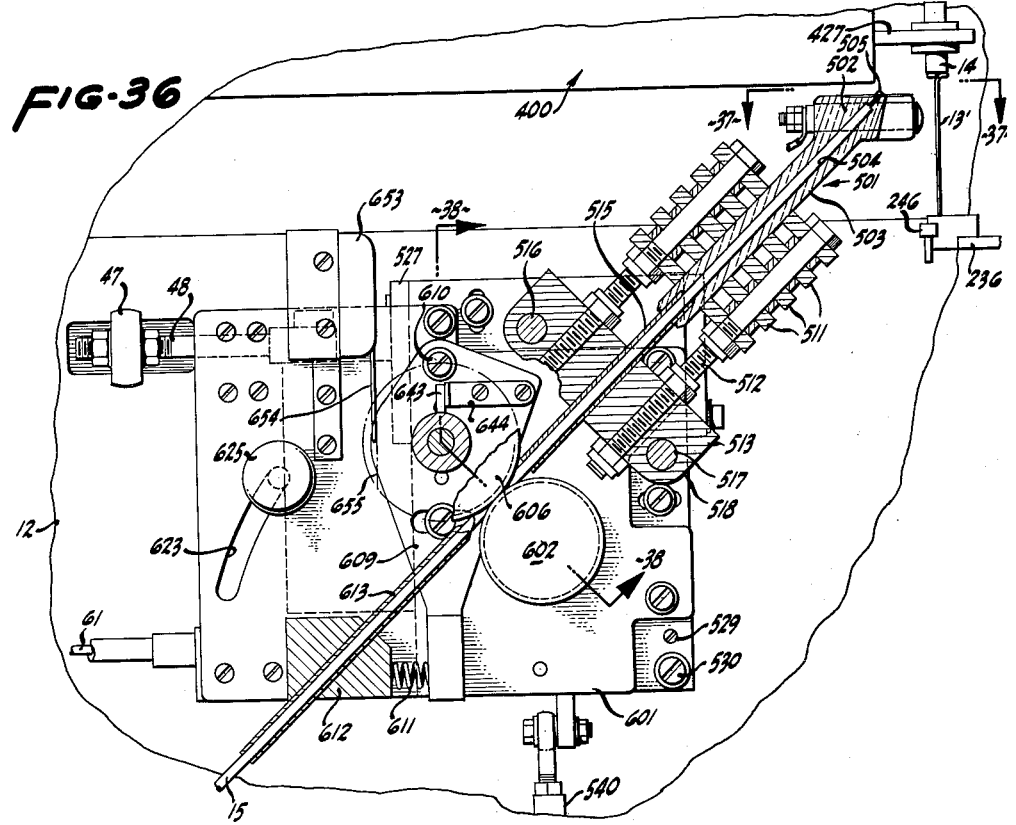
FIG-36
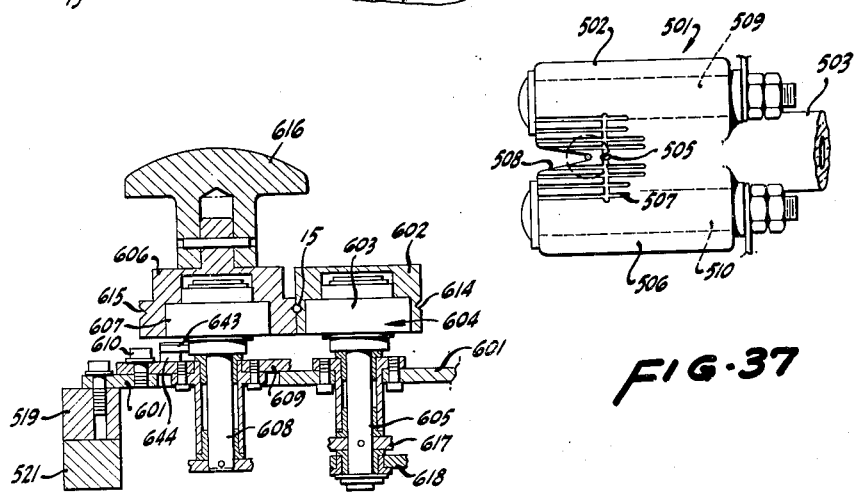
FIG-37
FIG-38
INVENTOR.
MEREDITH M. NYBORG

May 14, 1963  M. M. NYBORG  3,089,220
AUTOMATIC SOLDERING MACHINE
Filed Sept. 20, 1957  21 Sheets-Sheet 18

INVENTOR.
MEREDITH M. NYBORG
BY
Mellin and Hanscom
ATTORNEYS

May 14, 1963 M. M. NYBORG 3,089,220
AUTOMATIC SOLDERING MACHINE
Filed Sept. 20, 1957 21 Sheets-Sheet 20
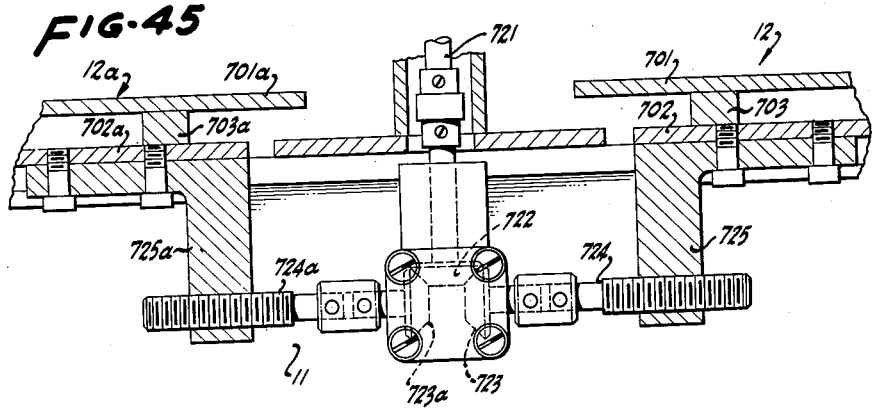
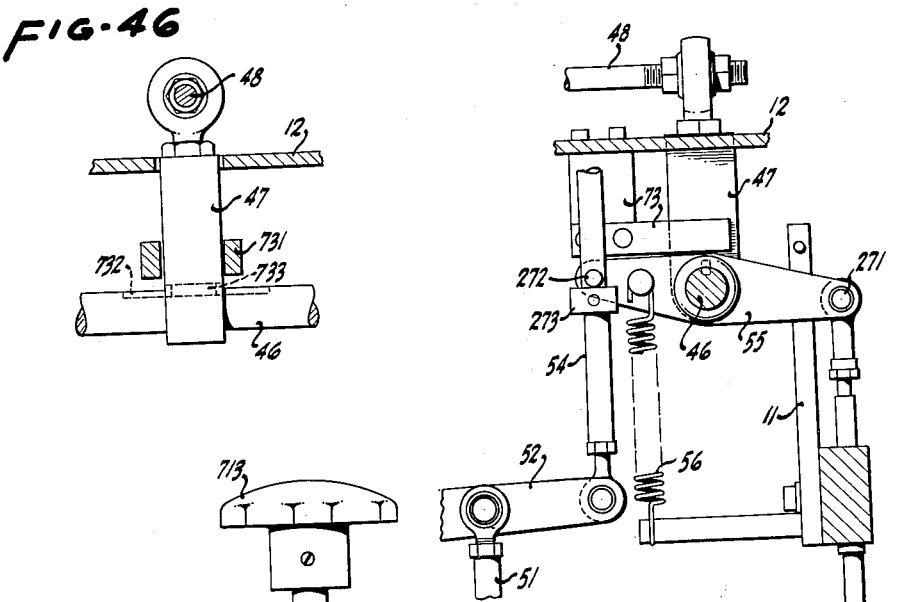
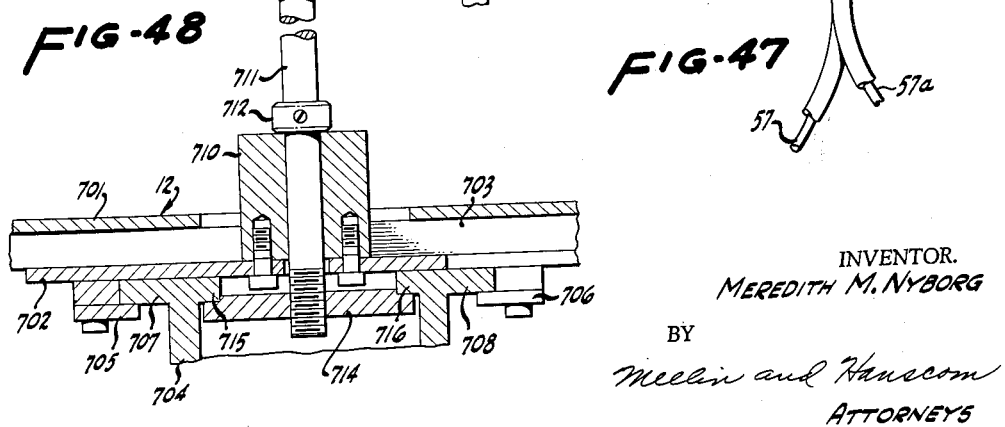
INVENTOR.
MEREDITH M. NYBORG
BY
Meelin and Hanscom
ATTORNEYS

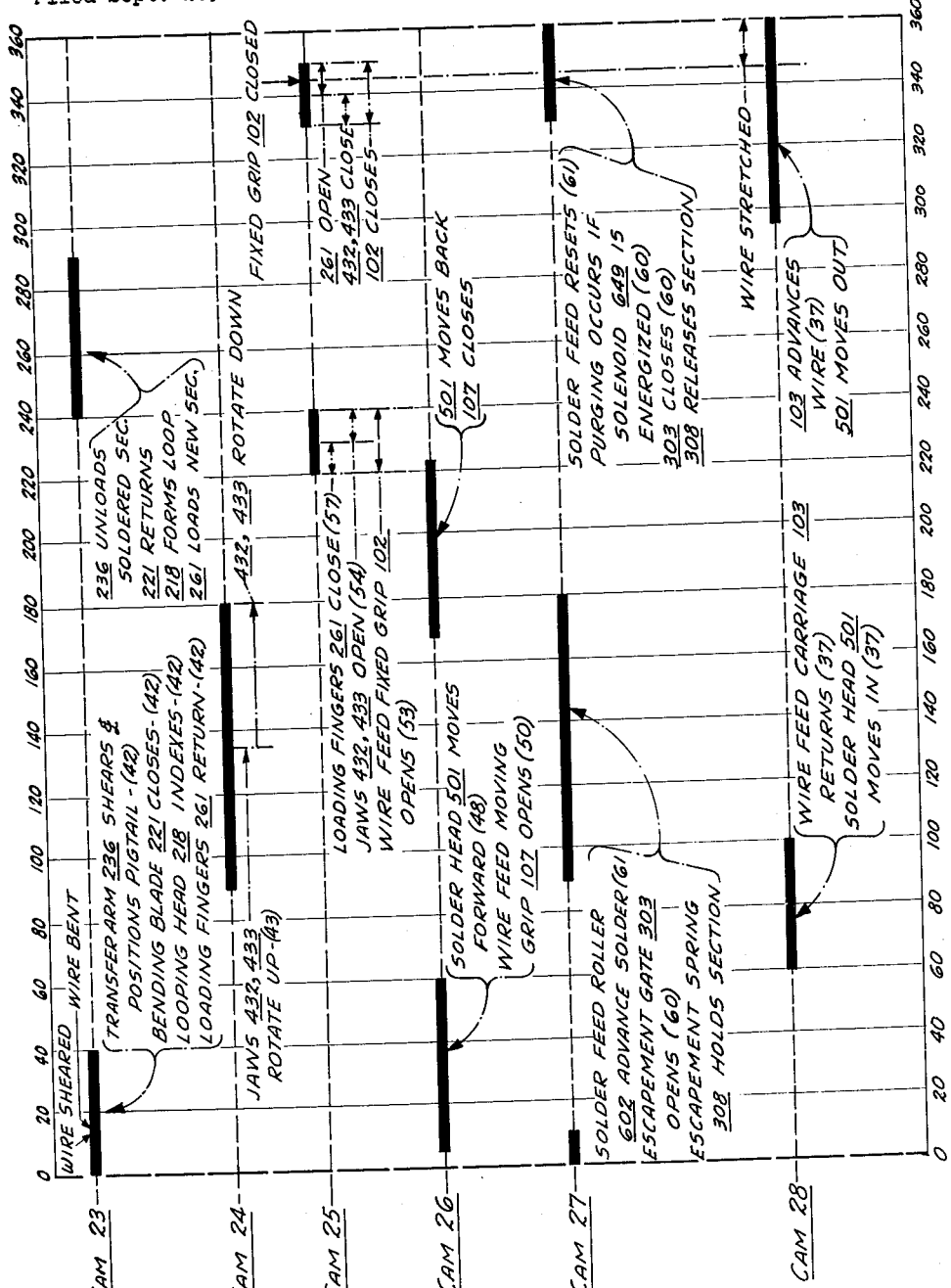

United States Patent Office 3,089,220
Patented May 14, 1963

3,089,220
AUTOMATIC SOLDERING MACHINE
Meredith M. Nyborg, 517 W. Highland Drive,
Camarillo, Calif.
Filed Sept. 20, 1957, Ser. No. 685,213
32 Claims. (Cl. 29—25.42)

This invention relates to soldering machines, and, more specifically, to such a machine as will automatically solder pigtail leads onto tubular capacitors. This application is a continuation-in-part of my copending application Serial No. 609,788, filed September 12, 1956, which is a continuation-in-part application of my prior application Serial No. 531,979, filed September 1, 1955.

One of the existing problems in the field of electronic parts manufacture is the soldering of the pigtail leads onto tubular capacitors. At present, the method of making capacitors includes various steps including the formation of a rolled tubular capacitor section from sheet aluminum foil and a suitable dielectric, the formation of a pigtail leads, the connection of the leads to each end of a capacitor section, and the subsequent casing of such a capacitor on metal, plastic or paper, as desired. In this method of manufacture, the biggest problems have been experienced in the third step; namely, the connection generally by soldering of the pigtail leads to the capacitor section. Even though the capacitor industry is currently producing approximately 500,000,000 tubular capacitors per year, no suitable machine has yet been devised to successfully perform this step of operation mechanically and, consequently, practically all of these capacitor units are currently being soldered by hand.

A skilled operator, working at top efficiency, and on capacitor units of minimum standards, requires approximately 7 seconds to solder each pigtail lead to one end of a capacitor section, or about 15 seconds for both ends of the capacitor section. Such an operator can thus produce about 4 capacitors per minute, or 240 per hour. On high quality capacitors, skilled operators can only produce about 30 capacitors per hour. In contrast to this, the machine devised by applicant has been designed to produce soldered capacitor units at the rate of 1800 units per hour, at a uniform quality comparable to current capacitor units of highest quality. A single operator can simultaneously service five of the present machines, or, that is, a single employee can now produce 9000 capacitor units per hour, as compared to a maximum production by hand of a skilled workman of approximately 240 per hour. A comparison of these figures clearly shows the production benefits available from applicant's invention.

A further problem exists as a result of the present manual soldering operations. As now carried out, the capacitor sections and formed pigtail leads are delivered to the operator for soldering. The pigtail leads are commonly supplied in bulk, and are easily bent in sorting them from the pile of leads. The further manual manipulations cause an even further bending of the leads so that when the capacitor has been soldered, the leads will be bent to some degree, and in almost any direction. This then necessitates that all further handling of the capacitors be done manually, or that each capacitor have its leads uniformly straightened so that automatic machinery will be able to perform any subsequent operation thereon. In the present invention, the pigtail leads are formed from straight wire immediately prior to the soldering operation, and the leads are not bent in any manner during the soldering operation so that the capacitor coming from the machine will have perfectly straight leads and each capacitor will be uniform so that automatic operation thereon may be easily carried out.

It is the primary object of this invention to provide an automatic soldering machine adapted to take wire from a bulk wire source and capacitor section from a supply source and to form pigtail leads from said wire and solder them onto the ends of the capacitor sections.

It is a further object of the invention to provide an automatic soldering machine comprising a pair of rotatable jaw members, means to insert a capacitor section into said jaws, means to position pigtail leads against the ends of the held capacitor section, a pair of soldering heads movable into engagement with the capacitor section ends, means to inject a measured amount of solder between said soldering head and said capacitor section ends, and means to rotate the jaw members during the soldering operation to abrade the ends of the capacitor sections against the soldering heads.

A further object is to provide an automatic soldering machine as set forth in the last object and further including means to form pigtail leads from bulk wire, the leads being sheared and carried to the held capacitor section by said positioning means, and means to advance said formed pigtails into shearing position.

A still further object of the invention is to provide an automatic soldering machine having a pair of jaw members, a capacitor feed station, means to carry a capacitor from said capacitor feed station to said jaw members, a looping device for forming a loop on the end of a wire, a wire feeding and straightening device for advancing a looped wire through said looping device, a transfer means for shearing said advanced looped wire and positioning said wire with the looped end adjacent said held capacitor section, a soldering head movable against said held capacitor, means to inject a measured amount of solder between said soldering head and said capacitor section, means to rotate the jaw members while said soldering head is in engagement with said capacitor section, means to move said soldering head from engagement with said capacitor section, and means to remove the soldered capacitor from said jaw members and to carry said soldered capacitor to a discharge point.

A still further object of the invention is to provide an automatic soldering machine as set out in the last object and having a power drive unit connected in synchronized relation to each of the operating mechanisms of the machine.

Another object of the invention is to provide a wire feeding unit adapted to straighten said wire and feed it in measured increments through the machine.

A further object of the invention is to provide a device for forming a loop on the end of a wire.

A further object is to provide a pigtail forming device adapted to operate on a continuous wire source to form a loop on the end of the wire, to advance the wire, to shear the advanced wire and to grip the wire as it is sheared so that the sheared wire may be transported to a desired position.

A further object of the invention is to provide a pair of jaw members and means to rotate said jaw members about the clamping center thereof.

Still yet another object is to provide a solder feeding mechanism adapted to operate from a reciprocating power source having a constant stroke and having means to feed a rod of solder thereby in a measured amount, and means to vary the amount of solder fed by the constant stroke power source.

A further object is to provide a solder feeding mechanism as set forth in the last object, further including means to intermittently advance an amount of solder for purging purposes.

Other objects and advantages will become apparent in the course of the following detailed description.

Referring now to the drawings forming a part of this application, and in which like parts are designated by like reference numerals throughout the same, FIG. 1 is a front elevational view of the complete machine embodying the principles of the invention.

FIG. 4A is a sectional view in elevation, illustrating the cam configuration of one of the drive cams.

FIGS. 5–11 illustrate the wire feeding and straightening unit of the machine.

FIG. 5 is a front elevational view of the wire feeding unit showing the movable gripping member moved away from the fixed gripping member.

FIG. 6 is a view similar to FIG. 5, showing the movable gripping member moved towards the fixed gripping member.

FIG. 7 is a sectional view taken on line 7—7 of FIG. 5, showing the fixed gripping member in closed position.

FIG. 8 is a sectional view taken on line 8—8 of FIG. 5, showing the movable gripping member in open position.

FIG. 9 is an elevational view of the wire feeding unit, as seen from the line 9—9 of FIG. 5.

FIG. 10 is an exploded view of the fixed gripping element of FIG. 7.

FIG. 11 is a fragmental view of the fixed gripping element of FIG. 5, illustrating the manner in which it is latched in open position.

FIGS. 12–26 illustrate the wire forming and transfer unit of the machine.

FIG. 12 is a front elevational view of the wire forming and transfer unit.

FIG. 13 is a side elevation of the device of FIG. 12, and taken on the line 13—13 thereof.

FIG. 14 is a sectional view, taken on the line 14—14 of FIG. 12, with parts shown in plan.

FIG. 15 is a sectional view, taken on the line 15—15 of FIG. 12.

FIG. 16 is a sectional view, taken on the line 16—16 of FIG. 14, with parts shown in elevation.

FIGS. 17 and 18 are operational views illustrating the loop forming operation.

FIG. 19 is a front elevational view of the left end of FIG. 12, on an enlarged scale.

FIG. 20 is a side elevation of FIG. 19, as seen from the line 20—20 thereof.

FIG. 21 is a sectional view, taken on the line 21—21 of FIG. 20.

FIG. 22 is a sectional view, taken on the line 22—22 of FIG. 14, and on an enlarged scale.

FIGS. 23 and 24 are views similar to FIG. 13, illustrating different positions of the parts during a cycle of operation.

FIG. 25 is an enlarged detail view illustrating the shearing of the looped pigtail.

FIG. 26 is an enlarged perspective view of the pigtail holding clamp on the transfer arm.

FIGS. 27–31 illustrate the capacitor section feeding unit.

FIG. 27 is a front elevational view of the capacitor section feeding unit.

FIG. 28 is a sectional view taken on the line 28—28 of FIG. 27.

FIG. 29 is a sectional view taken on the line 29—29 of FIG. 27.

FIG. 30 is a sectional view taken on the line 30—30 of FIG. 27.

FIG. 31 is a sectional view taken on the line 31—31 of FIG. 27.

FIGS. 32 and 33 illustrate the holding unit of the machine, FIG. 32 being an elevational sectional view thereof, taken on the line 32—32 of FIG. 2, and FIG. 33 being an exploded view of the operating mechanism of FIG. 32.

FIG. 34 is a perspective view illustrating a capacitor section with pigtails placed against each end thereof to be soldered thereto.

FIGS. 35–44 illustrate the soldering head and solder feed units of the machine.

FIG. 35 is a side elevational view of the soldering head and solder feed units.

FIG. 36 is a sectional view, taken on line 36—36 of FIG. 35.

FIG. 37 is an elevational view of the soldering head, as seen from the line 37—37 of FIG. 36.

FIG. 38 is a sectional view of the solder feed rollers, taken on the line 38—38 of FIG. 36.

FIG. 39 is an exploded view of the transversely and longitudinally movable soldering head carriage.

FIG. 40 is a sectional view of the solder feed linkage system, taken on the line 40—40 of FIG. 35, illustrating the relation of parts during a portion of the operative cycle.

FIG. 41 is a view similar to FIG. 40, illustrating the relation of parts during another portion of the cycle of operation.

FIGS. 42 and 43 are schematic views illustrating the adjustment of the feed roller linkage system of FIG. 40.

FIG. 44 is a sectional view of the feed roller linkage system.

FIG. 45 is a sectional detail illustrating the manner in which the unit supporting trays are simultaneously movable relative to the frame of the machine.

FIG. 46 is a fragmentary detail showing the connection between the soldering head carriage operator and the jackshaft on which the operator is mounted.

FIG. 47 is a sectional detail illustrating the actuating mechanism for the loading fingers of the transfer units of the machine.

FIG. 48 is a sectional detail illustrating the manner in which the unit supporting trays are mounted for reciprocal movement on the frame of the machine, and the manner in which they may be clamped in fixed relation thereto.

FIG. 49 is a timing chart illustrating the synchronization of the various components of the machine during a cycle of operation.

In terms of broad inclusion, the soldering machine operates on bulk wire and capacitor sections to form the wire into straight pigtail leads with looped ends which are then soldered onto the capacitor sections.

In general operation, for each full cycle operation of the machine, a single capacitor section is fed from a supply trough by an escapement mechanism, and is gripped and moved to a soldering station which includes a pair of jaws to hold the section during the soldering operation. The capacitor sections operated upon by this machine are of the tubular foil type.

During this time, wire, from a spool or other bulk storage, is fed to both sides of the machine by units which advance the wire in measured increments towards the center of the machine. These wire advancing units also act to stretch the wire in order that the wire will become straightened and will lose its tendency to curl.

The wire is then fed to units which form loops on the ends of the wires, and the wires are again advanced. Shearing mechanisms then operate to shear the advanced wires to form pigtails, the pigtails being then gripped and carried to the soldering station so that the loops of the pigtails are held against the ends of the gripped capacitor section.

Next, a pair of soldering heads moves into engagement with the end of the capacitor section, and molten solder is forced through the soldering heads. During this soldering operation, the capacitor section is rotated in order to abrade the surface thereof against the roughened solder heads so that any oxides on the capacitor section will be dislodged in order that a firm solder connection may be made between the wire leads and the capacitor section.

After the soldering operation has been completed, the solder heads are moved from soldering engagement, the solder hardens, and the finished capacitor is carried to a discharge chute.

Figure 1:
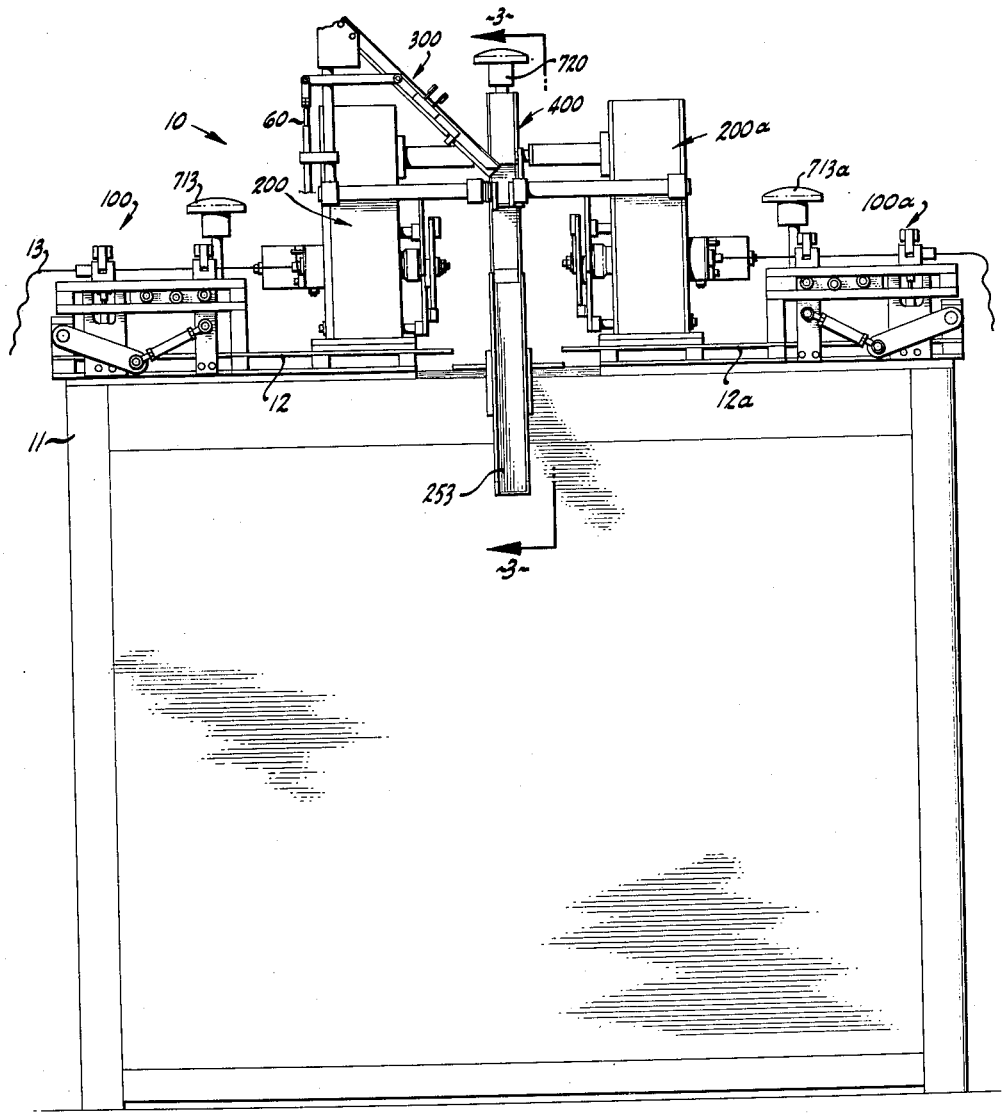
Figure 2:
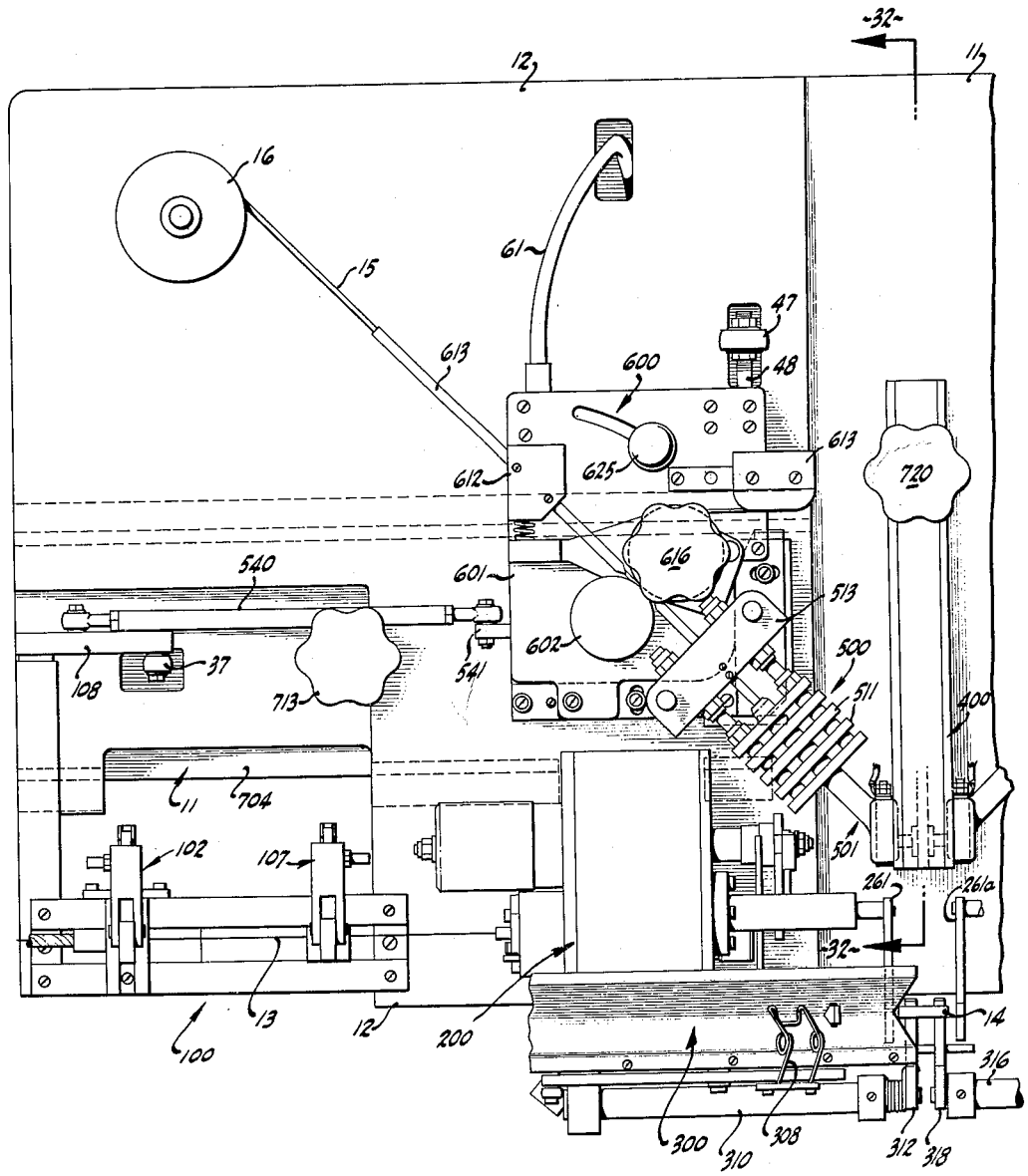
FIG. 2 is a plan view of the left-hand portion of the machine of FIG. 1.
Figure 3:
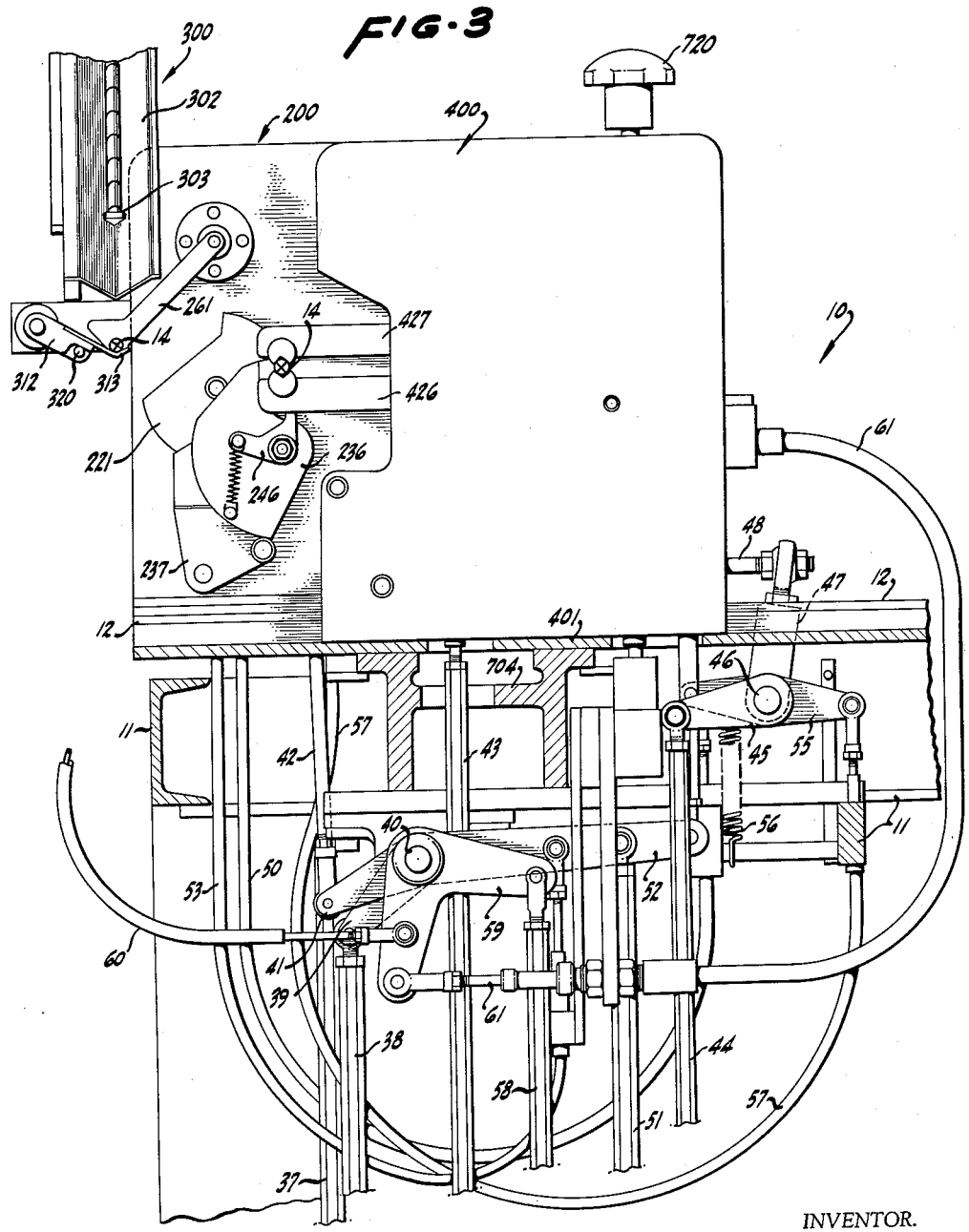
FIG. 3 is a transverse section taken on the line 3—3 of FIG. 1.

Referring now to the drawings, and specifically to FIGS. 1–2 thereof, the soldering machine, indicated generally by the reference numeral 10, comprises a rigid frame 11 on which two subframes, or trays, 12 and 12a, are mounted for longitudinal movement towards and away from the transverse center line of the machine. The trays 12 and 12a are fixed against movement relative to the frame 11 during operations on a given size capacitor section, and are only moved with relation to the frame 11 when it is desired to use the machine to operate on a different length capacitor section, and thus, in the following description, the trays can be considered as integral frame members during operation of the machine.

Mounted on the tray 12, at the outer edge thereof, is the wire feeding and straightening means, generally indicated by the reference numeral 100, which takes wire 13 from a source (not shown) and, after straightening such wire, feeds it to the bending and transfer unit 200, where the wire is formed with a loop and is cut into pigtail leads.

A capacitor section feed unit 300, also fixed relative to tray 12, serves to feed capacitor sections 14 one-by-one to the transfer unit 200, the transfer unit then carrying the wire lead 13 and capacitor section 14 to the capacitor holding unit 400, fixed relative to frame 11 centrally thereof.

The soldering unit 500, mounted on tray 12 for movement longitudinally and transversely, moves into soldering engagement with the capacitor and pigtail, and the solder feed unit 600 feeds solder 15 from a supply spool 16 to the soldering unit 500.

The right-hand tray 12a carries wire feeding means 100a, transfer means 200a, soldering unit 500a, and solder feed unit 600a identical to those carried by tray 12. In the following description, only the left-hand portion of the machine will be described as the functioning of the right-hand units is identical. Right-hand elements identical to left-hand elements are indicated by the same reference numeral with the letter "a" appended.

*The Power Drive for the Machine*

Figure 4:
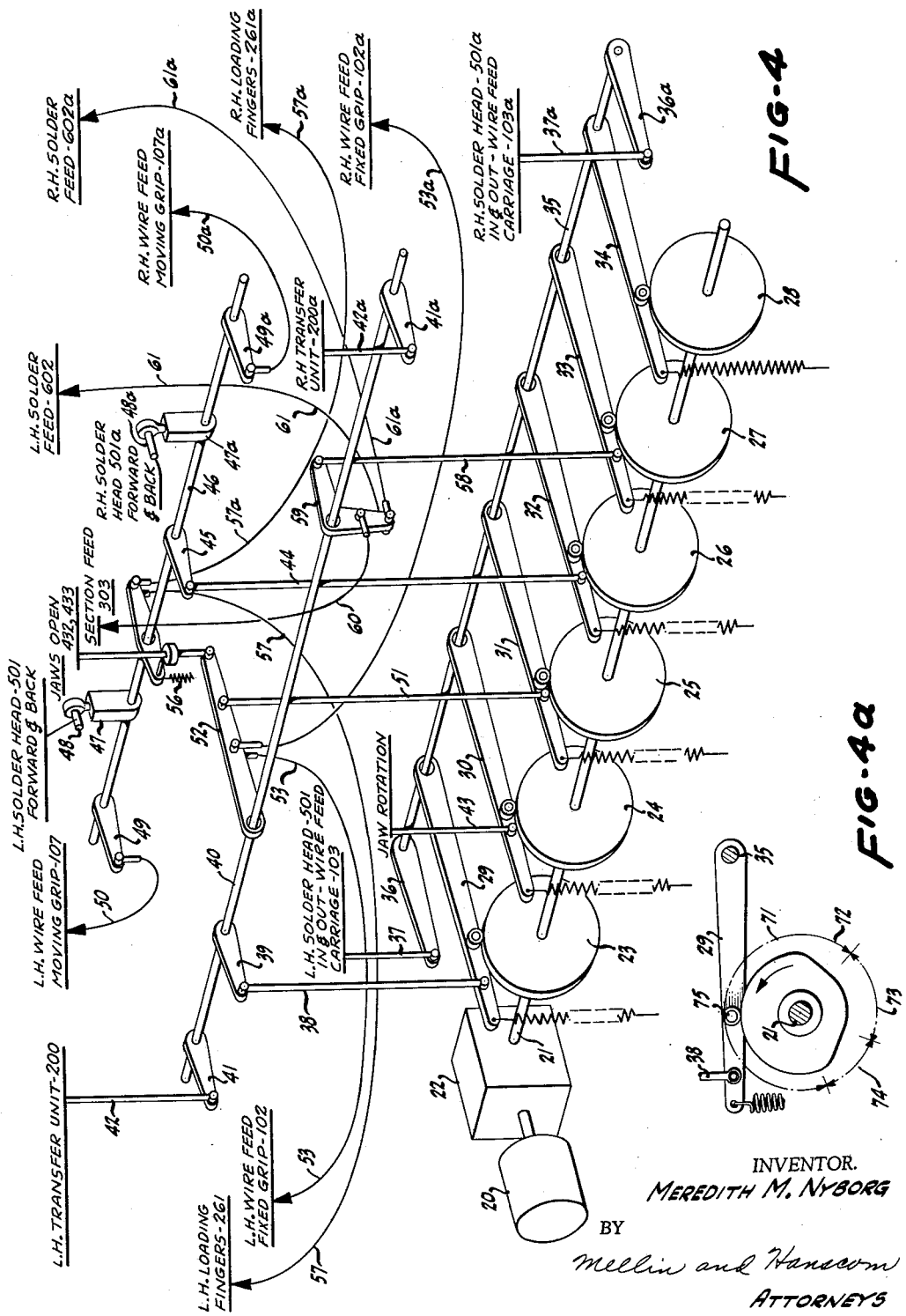
FIG. 4 is a schematic view of the drive unit of the machine.
Figure 5:
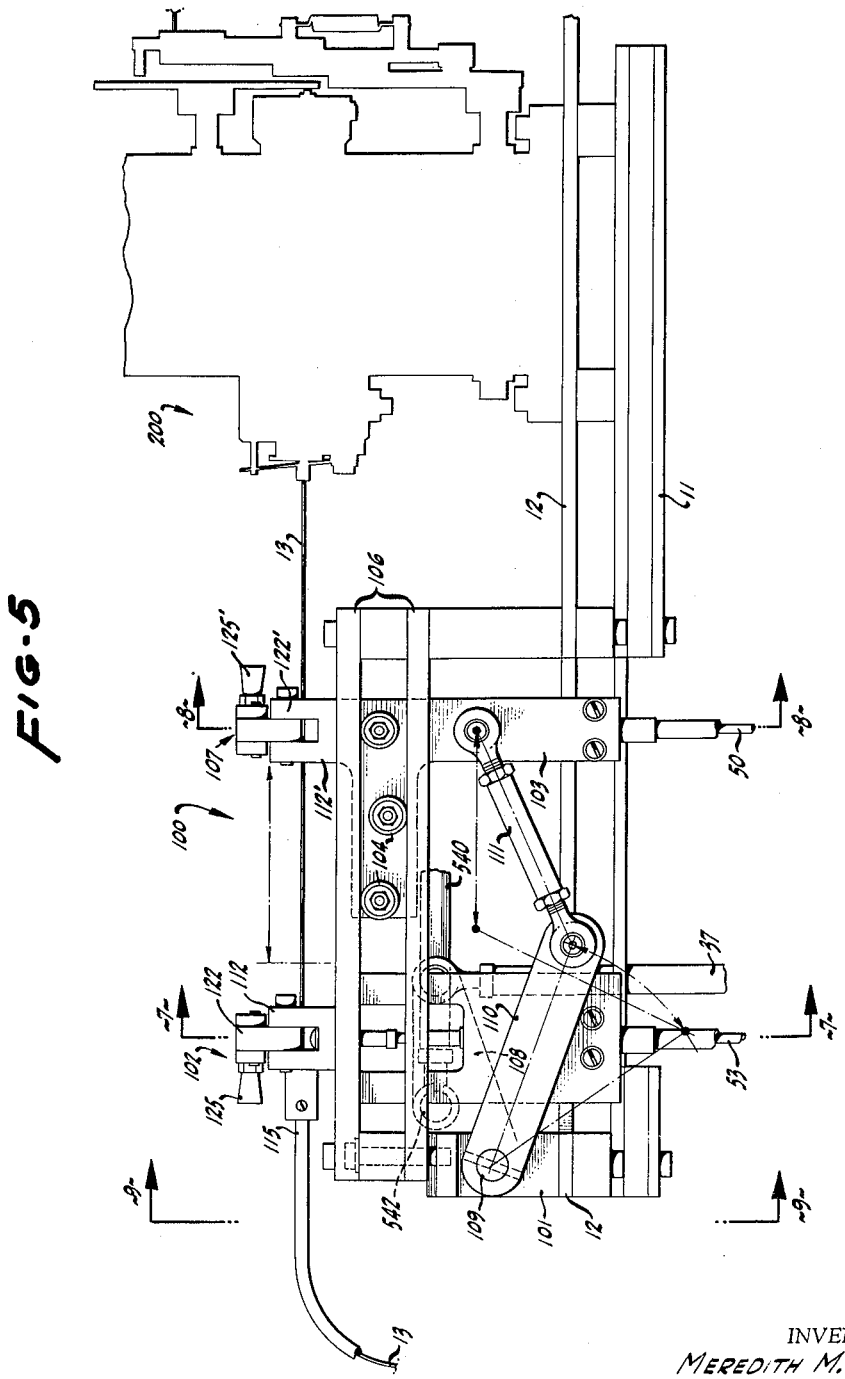
Figure 9:
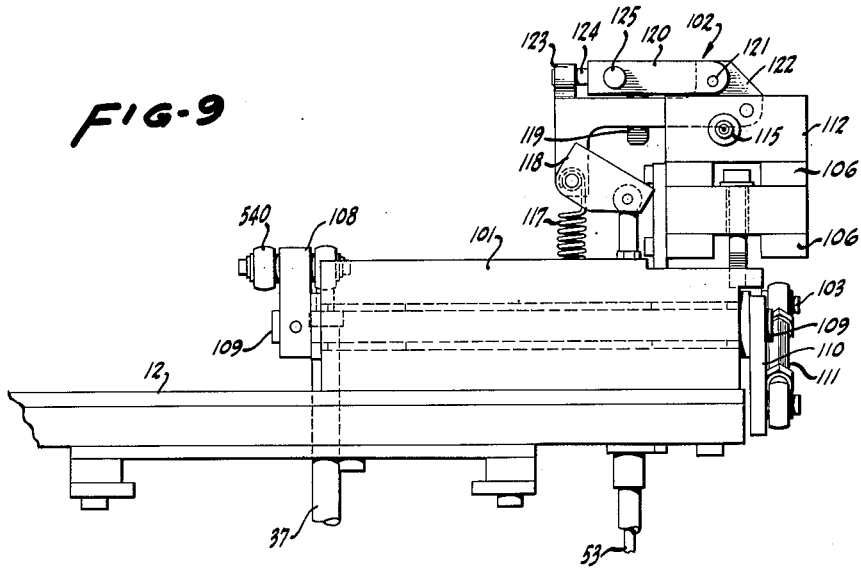

The soldering machine 10 is driven from a power drive means located in the lower part of the machine 10, and is schematically illustrated in FIG. 4.

A motor 20 drives cam shaft 21, through a suitable gear reduction unit 22, to rotate cams 23 through 28 fixed to shaft 21. Each of these cams is adapted to oscillate its respective cam follower levers 29 through 34, all of which are held against the cams by suitable springs. Lever 34 is keyed to jackshaft 35, journaled for rotation in frame 11, while the other levers 29–33 are rotatably mounted on shaft 35. As cam 28 rotates, the lever 34 will oscillate jackshaft 35 and through cranks 36 and 36a will provide a reciprocatory motion to connecting rods 37 and 37a. These rods, through their reciprocatory movement, provide the power drive for the longitudinal movement of the left and right-hand soldering units 500 and 500a, as well as for longitudinal movement of the left and right-hand wire feeding units 100 and 100a.

The rotation of cam 23 imparts a reciprocatory movement to link 38, to oscillate crank arm 39 and jackshaft 40, the latter being journaled in frame 11, in order to provide oscillatory movement of crank arms 41 and 41a and reciprocatory movement of connecting rods 42 and 42a. Such movement provides the power drive for the left and right-hand transfer units 200 and 200a.

The rotation of cam 24 imparts a reciprocatory movement to connecting rod 43 to provide a power drive for rotation of the jaws of the holding unit 400.

Cam 26, through link 44 and crank arm 45, acts to oscillate jackshaft 46, which movement is transmitted through cranks 47 and 47a to provide reciprocatory movement to connecting arms 48 and 48a to provide for transverse movement of the left and right-hand solder feed units 500 and 500a. In addition, the crank arms 49 and 49a provide reciprocatory movement of the flexible shafts 50 and 50a which transmit power to the moving wire grips of the left and right-hand wire feeding units 100 and 100a. The flexible shafts 50 and 50a are conventional power transmission units having an outer flexible casing secured to the frame and an inner flexible power transmitting shaft free to move longitudinally within the outer casing.

Cam 25, through link 51 on lever 31, acts to oscillate lever 52 freely journaled on jackshaft 40, to provide a reciprocatory movement of the flexible shafts 53 and 53a which are connected to the fixed wire grips of the wire feeding units 100 and 100a. The lever 52 also imparts a reciprocatory movement to the connecting rod 54 which provides the power drive for the opening and closing of the jaw members of the holding unit 400. The upward movement of connecting rod 54 also serves to rotate lever 55 against the bias of spring 56 to provide a reciprocatory movement of the flexible shafts 57 and 57a, thereby providing a power drive for the loading fingers of the left and right-hand transfer units 200 and 200a.

The remaining cam, 27, acts through link 58 to oscillate bell crank 59 rotatively mounted on jackshaft 40 to provide reciprocatory movement of flexible shaft 60 and transmit a power drive to the capacitor section feeding unit 300, and also provides a reciprocatory movement to the flexible shafts 61 and 61a which is transmitted to the solder feeding units 600 and 600a.

FIG. 4A illustrates a typical cam configuration of one of the cams 23 through 38. The cam illustrated (cam 23) has a section 71 thereof of constant radius, and a second section 73 of constant radius less than the radius of section 71. Two transitional sections 72 and 74 connect the two sections of constant radius. In a cycle of rotation of cam 23, the spring biased lever 29 will remain stationary until the cam follower 75 thereon rides down the transitional section 72, imparting a downward movement during this interval to connecting rod 38. The lever 29 and connecting rod 38 again remain stationary until the cam rotates and the transition section 74 engages the cam follower 75 to force the lever 29 and connecting rod 38 upwardly. Thus, the motion of connecting rod 38 is of an intermittent reciprocatory character, with periods of dwell between movements thereof. The other cams 24 through 28 also provide similar intermittent reciprocatory movement of their respective cam follower levers 30 through 34. The timed relation of such movements will be discussed hereinafter.

*The Wire Feeding Unit*

In general, the wire feeding unit 100 serves to take a strand of wire from a supply source and advance the wire intermittently in exact increments to the succeeding wire handling units of the machine. In advancing the wire, the wire is stretched beyond its elastic limit in order to straighten the wire and to remove any tendency thereof to curl or kink. The wire feeding unit 100 in general comprises a fixed grip and a movable grip operating in timed sequence such that the movable grip clamps onto the wire to pull the wire through the open fixed clamp. Shortly before the limit of movement of the movable clamp is reached, the fixed grip clamps onto the wire so that the wire is firmly clamped by both gripping members and the continued movement of the movable grip acts to stretch the wire. The movable grip is then unclamped from the wire and is returned to its starting position while the wire remains clamped by the fixed grip, to complete the cycle.

Referring now to FIGS. 5–11, the wire feeding unit 100 comprises a frame 101, rigidly secured to tray 12, having a fixed grip assembly 102 mounted thereon. A movable carriage 103, provided with a plurality of rollers 104 mounted for movement between track members 106 of frame 101, carries the movable grip assembly 107 towards and away from the fixed grip assembly 102.

The reciprocating connecting rod 37 from the power drive unit is connected to crank arm 108 to oscillate shaft 109 rotatably journaled in frame 101. Crank arm 110 is thus oscillated and, through link 111, connected between crank arm 110 and carriage 103, serves to move the carriage between the positions shown in FIGS. 5 and 6, with one cycle of movement of carriage 103 occurring for each cycle of reciprocation of connecting rod 37.

Figure 10:
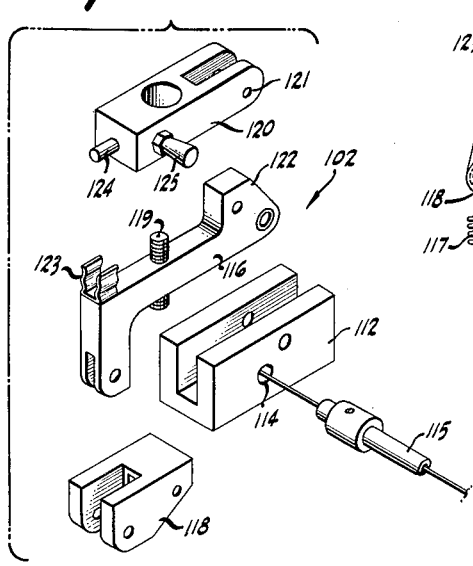

The fixed grip assembly 102, shown in detail in FIGS. 7 and 10, comprises a generally U-shaped member 112, fixed with relation to frame 101 and provided with a bearing plate 113 secured to the bottom thereof. Apertures 114 are formed in the sides of member 112 to allow the wire 13 to pass therethrough, and a hollow wire guide member 115 is attached to the inlet aperture 114.

A clamping lever 116, rotatively mounted in the channel of the U-shaped member 112, is biased downwardly by spring 117 to clamp the wire 13 between the lever and the bearing block 113. The lower end of lever 116 carries thereon a rotatable abutment plate 118 secured at its outer end to flexible shaft 53. As the flexible shaft 53 moves upwardly in its reciprocatory movement, the abutment plate 118 will rotate upwardly into engagement with adjusting screw 119, and further upward movement will rotate the clamping lever 116 against the bias of spring 117 to unclamp the wire 13 so that it is free to move through the grip assembly. Downward movement of the shaft 53 will cause reverse rotation of clamping lever 116 under the bias of spring 117 to clamp the wire 13. The exact moment when the wire 13 is unclamped during the cycle of movement of flexible shaft 53 may be easily adjusted by moving the adjusting screw 119 upwardly or downwardly, as desired. By the arrangement as shown, the clamping force on the wire is constant, as such force is brought about solely by the spring 117, and the amount of force exerted by the flexible shaft 53 may vary within wide limits without affecting the clamping force on the wire.

Figure 11:
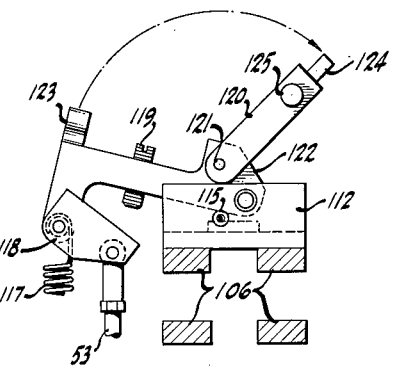
Figure 39:
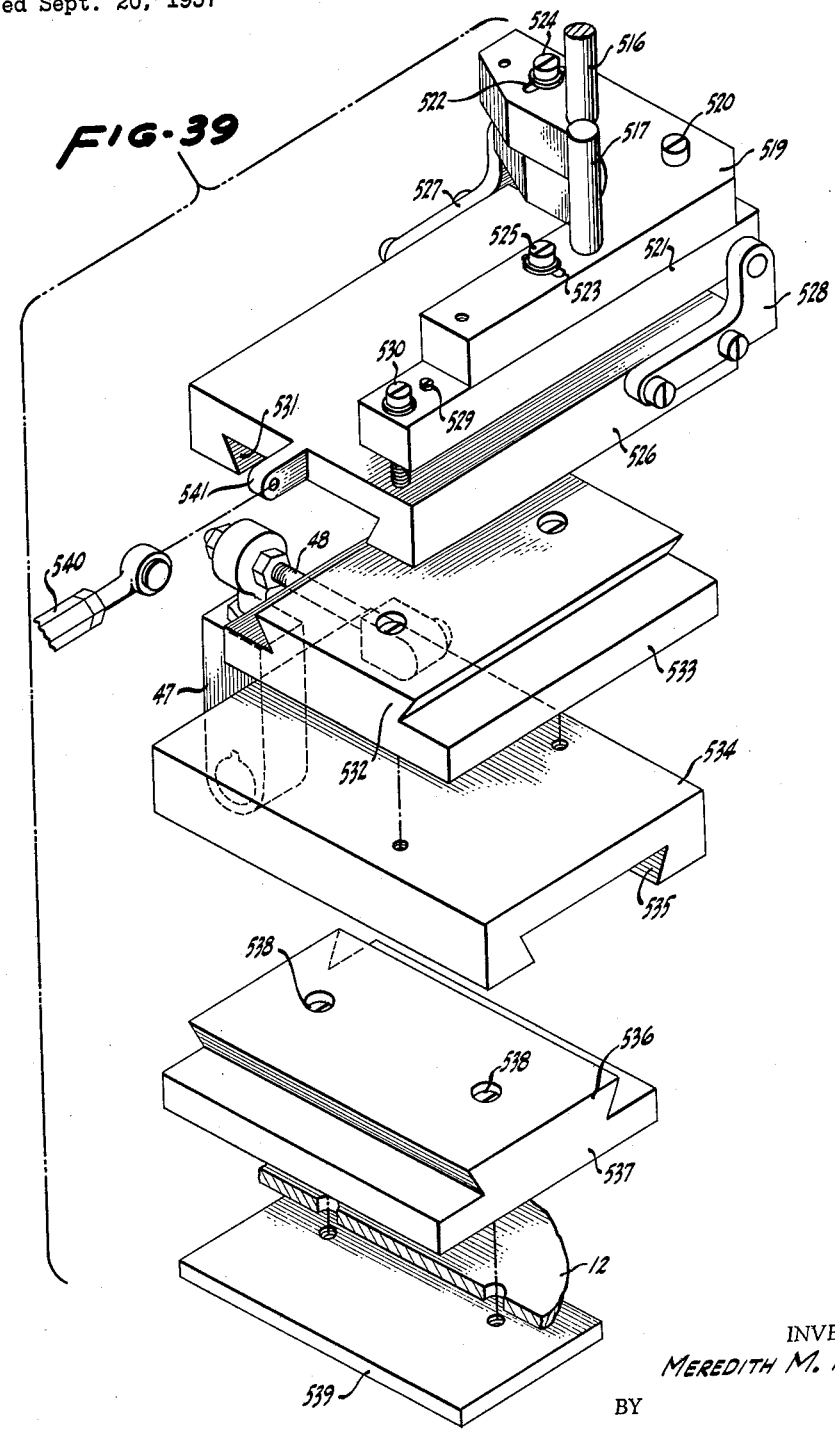

The gripping assembly 102 is adapted to be locked out of gripping engagement by latch member 120 pivotally mounted at 121 on an upstanding ear 122 of clamping lever 116. As shown in FIG. 7, the latch 120 is in its inoperative position, being held in that position by the engagement of spring clamp 123 with latching member pin 124. The assembly is latched by pulling upwardly on handle 125 and by then rotating latch member 120 around the pivot point 121, as shown in FIG. 11. Since the pivot point is off center with respect to the longitudinal axis of the latch member, the clamping lever 116 will be cammed upwardly as the latch member engages the upper surface of the U-shaped member 112, and will be held in that position when the latch member 120 is rotated to its limit of rotation and released. With the clamping lever 116 thus moved and held out of engagement with the wire 13, the flexible shaft 53 may pivot the plate 118 upwardly without coming into engagement with the adjustment screw 119. By this construction, it is possible to latch the gripping assembly in the open position without any necessity for stopping the reciprocatory movement of the flexible shaft 53, and the machine may be continued in operation with the wire feeding unit 100 rendered inactive in regards to its wire feeding function, thus allowing operational adjustments of other units of the machine or allowing for immediate discontinuance of the wire feeding function whenever desired.

The movable gripping assembly 107, illustrated in FIG. 8, is identical in operation to the fixed gripping assembly 102 described above, and like part have ben designated by like reference numerals, with the addition of a prime, as, for example, the clamping lever of the movable gripping assembly is designated by the reference numeral 116'.

In the operation of the wire feed unit 100, wire 13 is inserted through the apertures 114 and 114' of the gripping assemblies 102 and 107, respectively, and the reciprocating drive members 37, 50 and 53 are driven from the power drive cams in timed sequence to perform the following functions. With the unit in the position as shown in FIG. 6, the fixed gripping assembly 102 is in its open position, the movable gripping assembly 107 is in its closed position, and the carriage 103 is starting to move to the right. When the carriage 103 has traveled a distance as indicated by the arrow 126, the flexible shaft 53 will have been moved downwardly, allowing spring 117 to clamp the clamping lever 116 against the wire 13 to prevent further movement of wire through the fixed gripping assembly 102. The wire is now clamped by both gripping members and the continued movement of carriage 103 to the limit of its travel, indicated by arrow 127, stretches the wire to straighten the wire.

With the carriage 103 at the limit of movement away from the fixed clamp assembly, the flexible shaft 50 moves upwardly to release the clamping lever 116' from clamping engagement with the wire, and the connecting rod 37 is then moved downwardly to return the carriage 103 to its starting position. After the carriage has so returned, the flexible shaft 50 is moved downwardly to clamp the wire by the movable gripping assembly, and the flexible shaft 53 is moved upwardly to unclamp the wire by the fixed gripping assembly, and another cycle may begin. The amount of wire advanced from the feeding unit 100 during each cycle of operation is equal to the total travel of the movable carriage, as indicated by the arrow 127.

It is to be noted that at all times during the operation of the wire feeding unit, the wire 13 is gripped by either or both of the gripping assemblies, and thus there is no possibility of the wire slipping in either direction through the unit, thereby avoiding any differences in lengths fed by the unit in different cycles.

It has been found that an approximate 10% elongation of the wire by stretching results in excellent straightening without an appreciable loss in strength of the wire.

*Wire Forming and Transfer Unit*

In general, the wire forming and transfer unit 200 receives the wire from the wire feeding unit 100, and forms the leading end of the wire into a loop normal to the axis of the wire. The wire is again advanced, sheared to form a pigtail lead of a desired length, and transferred to the soldering station of the machine.

Referring now to FIGS. 12–26, the wire forming and transfer unit 200 comprises a frame 201, supported in fixed relation to tray 12. A cylindrical housing member 202 fixed to frame 201 holds collar 203 secured to the left end of wire support tube 204. The collar 203 is flattened at 205 and engages a similarly flattened portion of housing member 202 to prevent rotation of the collar and wire support tube 204 with respect to frame 201. The wire support tube 204 is prevented from longitudinal movement thereof to the right by means of the shoulder 206 on collar 203, while leaf spring 207 prevents longitudinal movement of the support tube 204 to the left. However, if it is desired to remove or replace the support tube 204, the leaf spring 207 may be pivoted around nut 208 to move the spring out of holding engagement with collar 203, and the collar and support tube may be withdrawn from the unit.

Mounted in fixed relation on the right end of support tube 204 is a die member 209 having a die head 210 provided with a slot 211 normal to the wire passage 212 through the die member.

Surrounding the tube support 204 and coaxial therewith is a sleeve member 213 journaled for rotation in frame 201 on bearings 214 and 215. Bearing 216 allows rotative movement between sleeve 213 and die member 209 and also centers the die member. A loop forming head 217 is fixed to sleeve 213 for rotation therewith, and carries a looping blade 218 therein, biased into engagement with die member 209 by means of leaf spring 219.

A bending blade 221, fixed to shaft 222, journaled for rotative movement in frame 201, is adapted to rotate across the die head 210, and is provided with a bending face 223 adapted to engage the wire 13 protruding from the die head 210 and to bend the wire at right angles to itself so that it lies within the groove 211 of the die head.

When the wire is thus bent into this position, the sleeve 213 and looping head 217 are rotated from the position shown in FIG. 17 to the position shown in FIG. 18. The tip 224 of the looping blade 218 engages the wire 13 and forces it around the outside of the die head 210 to form a complete loop, as illustrated in FIG. 18.

The sleeve 213 and bending blade 221 are power driven in the following manner. The reciprocating connecting rod 42 is connected at the upper end thereof to crank 225 fixed to shaft 226, to cause an oscillatory movement of this shaft. Gear 227, fixed to shaft 226, is in mesh with gear 228, fixed to shaft 222, to transmit oscillatory movement to shaft 222 and the bending blade 221. A friction clutch 229, mounted on shaft 222, has an external gear 230 meshing with gear 231 fixed to sleeve 213.

The gear ratio between shafts 226 and sleeve 213 is such that with the amount of reciprocation available from connecting rod 42, the sleeve 213 and looping head 217 are rotated approximately 400° in a clockwise direction from the position as shown in FIG. 17. Fixed to sleeve 213, at the left end thereof, is a spiral cam 232 having a radially extending abrupt face 233. This cam serves to index the looping head by allowing free rotation of sleeve 213 in the clockwise direction during the 400° of rotation thereof, as the wire loop is formed on the end of wire 13. Such rotation will move the cam 232 approximately 40° further than a full rotation thereof, so that when the sleeve 213 is then rotated in the opposite direction, by the reverse movement of the gear train between connecting rod 42 and sleeve 213, the sleeve will move back until the spring loaded detent 234 engages the abrupt face 233 of cam 232. With the sleeve 213 thus indexed to the position of FIG. 17, the remaining reverse movement of the gear train is taken up by the friction clutch 229.

During the loop forming operation described above, the bending blade 221 remains in adjacency to the die head 210 so that the wire 13 remains confined between the bending blade and looping head 217 during the looping operation. After the loop has been formed, the bending blade rotates so that the forward path of progress is unimpeded. During the time before the bending blade again reverses its rotation, the wire 13 is advanced by the wire feeding unit 100 to the position as shown in FIG. 25, so that the shearing and transfer function may be carried out.

The shearing and transfer functions are performed by the following mechanism. A transfer arm member 236 is fixed on the outer end of shaft 226 for oscillatory movement therewith. Cooperating with this arm is a shear plate 237, mounted on shaft 238, and biased by spring 239 so that cam follower 240 on shear plate 237 is held against arm 236. Spring 241, surrounding shaft 238 and confined between shoulder 242 on shaft 238 and frame 201, presses shear plate 237 against the inner face of arm 236. Fixed to the upper end of shear plate 237 is a shear member 242 having a notch 243 adapted to engage the wire 13.

A second shear member 244 is mounted on the leading edge of arm 236 and has a V-groove 245 adapted to receive the wire 13 therein.

A holding lever 246, freely mounted on shaft 226, is biased by spring 247 in a counterclockwise direction, and carries thereon a cam follower 248 positioned to engage the upper sloping cam face 249 of shear plate 237. The shear member 244 is longitudinally grooved at 250 to receive the holding lever 246 so that the wire 13 may be clamped therebetween, as illustrated in FIG. 26.

The cycle of operation of the above described mechanism is illustrated in FIGS. 23, 24 and 13. FIG. 23 represents the position of the elements at the start of the cycle, with the cam follower 240 held against the flat portion 258 of transfer arm 236 so that the shear plate 237 is in its full counterclockwise direction, and with the holding lever 246 held in its uppermost position relative to shear member 244. The wire 13 is free to advance, and is fed forwardly by the wire feeding unit 100.

The connecting rod 42 then rotates shaft 226 and transfer arm 236 in a clockwise direction to the position illustrated in FIG. 24. The cam follower 240 has been forced downwardly by arm 236 to pivot shear plate 237 in a clockwise direction such that the wire 13 rests in the notch 243 of the shear member 242. At the same time, the holding lever moves in a counterclockwise direction under the bias of spring 247 since the cam follower 248 moves downwardly along the sloping surface 249 of the shear plate, until the holding lever 246 rests on the top of the wire 13.

Continued clockwise movement of arm 236 causes engagement of the shear member 244 thereon with the bottom of wire 13 and the continued relative movement between the shear members 242 and 244 on the shear plate 237 and arm 236, respectively, shears the wire 13 to form a pigtail 13'. The sheared pigtail is now held in the groove of the shearing member 244 by the holding lever 246 and the arm 236 continues its rotation to the final position at the soldering station illustrated in FIG. 13.

The transfer arm 236 is retained in the final position during the portion of the cycle necessary to perform the soldering function, as will hereinafter be discussed.

The transfer arm 236 is then returned to its original position, with the soldered capacitor being held by the pigtail 13' clamped by the holding lever 246. As the arm 236 rotates back to the position shown in FIG. 24, the holding lever follower 248 will again engage the shear plate at 249 to unclamp the pigtail 13', with the wire resting in the V-notch 245 of arm 236. Shortly before the arm reaches its initial position of FIG. 23, the walls 252 of the inclined discharge trough 253 will engage the pigtail and lift it out of the notch 245 so that the finished product may slide down the discharge trough.

The shearing mechanism described above may be adjusted to move the shearing point of the pigtail 13' closer to, or further from, the die head 210, so that different size loops may be formed on the end of the wire 13 when the machine is adjusted for different size capacitors and different size die heads 210 are used.

The left end of shaft 226 is rotatably journaled in the internally threaded cup member 255, which is threaded onto hub 256 fixed to frame member 201, so that rotation of cup member 255 will move shaft 226 axially with respect to the frame. A setscrew (not shown) enables cup member 255 to be secured to hub 256 after a desired adjustment has been accomplished. Shaft 226 is slotted to receive key 257 therein, said key allowing shaft 226 to move axially with respect to gear 227 while maintaining driving engagement therebetween. Sleeves 258 and 259 prevent axial displacement of gear 227.

The transfer unit 200 also incorporates mechanism to transfer individual capacitor sections 14 from the capacitor feed unit 300 to the soldering station, such transfer being in timed relationship with the transfer of the sheared wire pigtail 13'.

This mechanism includes a loading finger 261 fixed on shaft 262 which is rotatably and longitudinally movable within sleeve 263 fixed to frame 201. The outer end of the loading finger 261 is roughened at 264 to frictionally engage and hold a capacitor section 14. The loading finger is moved towards and away from frame 201 by means of the reciprocatory flexible shaft 57 from the power drive previously discussed. The flexible shaft 57 is secured at its upper end to crank arm 265, which, in turn, is fixed to shaft 266 rotatably journaled in frame 201. Crank 267, also fixed to shaft 266, converts the oscillatory motion of shaft 266 through universal link 268 to provide a reciprocatory movement of shaft 262. As the flexible shaft 57 moves downwardly with relation to frame 201, the above linkage will cause the shaft 262 and loading finger 261 to move outwardly from frame 201 towards the center of the machine 10.

The loading finger 261 is oscillated about shaft 262 as a center by means of crank 269 fixed to shaft 262 which is connected by link 270 to gear 227 fixed on the shearing mechanism shaft 226. Thus, as the connecting rod 42 from the power drive source moves upwardly, the link 270 will move upwardly to rotate shaft 262 and loading finger 261 in a counterclockwise direction, as viewed in FIG. 13.

The loading finger 261 of unit 200 and the loading finger 261a of unit 200a are both moved inwardly towards each other by a common spring 56 (FIGS. 4 and 47), and thus always act to center a capacitor section 14 gripped therebetween in relation to the center line of the machine 10. The actuating flexible shafts 57 and 57a for the in and out movement of the loading fingers 261 and 261a, respectively, are both connected on a common pin 271 on the end of lever 55, so that rotation of that lever about jackshaft 46 will cause the flexible shafts to be moved equal amounts in relation to frame 12. The other end of lever 55 is provided with a pin 272 engageable with the upper surface of collar 273 fixed to connecting rod 54. As rod 54 moves upwardly, the collar 273 will engage pin 272 to rotate lever 55 against the bias of spring 56, and will cause the flexible shafts 57 and 57a to move downwardly. Such movement will be transmitted to the loading fingers 261 and 261a, causing them to move apart from one another. When the connecting rod 54 moves downwardly, the collar 273 also moves downwardly, allowing spring 56 to pivot lever 55 in a counterclockwise direction, causing the loading fingers to move towards each other so that they may grip a capacitor section 14 therebetween. After such a capacitor section is gripped, the loading fingers are restrained from further movement towards each other and the collar 273 on connecting rod 54 moves downwardly below pin 272 or lever 55, and the single spring 56 supplies the holding force to hold the capacitor section by the loading fingers. Even if the capacitor section 14, as seen in FIG. 12, had been shifted to either side of the central position shown therein, the inward movement of the loading fingers towards each other is equal, and the capacitor section will be shoved centrally of the machine and finally gripped by both loading fingers in such a central position.

The two movements of the loading fingers 261 and 261a are carried out in the following time relation. In the starting position of a cycle of operation, the loading finger 261 is as illustrated in FIGS. 12 and 13, with the finger moved towards frame 201 and rotated to a position in alignment with a capacitor section 14 in the capacitor feed unit 300. The loading finger is then moved by flexible shaft 57 towards the capacitor section to engage same. The connecting rod 42 then moves upwardly to rotate the loading finger in a counterclockwise direction to the position shown in FIG. 23, wherein the capacitor section 14 is positioned to be received by the holding arms of the holding unit 400. The loading finger 261 is held in this position until the holding arms engage the section 14, as shown in FIG. 24. The loading finger 261 is then moved towards frame 201 (away from capacitor section 14) by the reverse movement of flexible shaft 57, and, finally, the reverse movement of connecting rod 42 rotates the loading finger 261 back to its initial position.

It will be noted that the loading finger 261 operates from the same power drive source; namely, the reciprocating connecting rod 42, as does the pigtail transfer arm 236 previously described, and thus the operative movements of the loading finger occur at the same time as do the movements of the transfer arm. The loading finger will be carrying a new capacitor section to the holding unit 400 at the same time that the transfer arm is carrying a soldered capacitor away from the holding unit, and the loading finger will be returning to get the next capacitor section while the transfer arm is carrying the pigtail to the capacitor section held by the holding unit 400.

*Capacitor Section Feed Unit*

In general, the capacitor section feed unit 300 operates to feed capacitor sections 14 to a position whereby the loading fingers 261 and 261a previously described may grip the sections and transfer them to the soldering station. This capacitor section feeding is accomplished by means of a supply chute and an escapement mechanism operated in timed relation to the rest of the machine 10 for releasing the sections one-by-one to slide down the chute onto a pair of support arms.

Referring now to FIGS. 27-31, the capacitor section feed unit 300 comprises a frame 301 mounted in fixed relation to the frame 201 of the transfer unit 200 and supporting thereon a downwardly sloped V-shaped chute 302 adapted to receive a plurality of capacitor sections 14 in end-to-end relationship therewithin. A disappearing gate member 303 protrudes through slit 304 in the bottom of the chute 302 to normally restrain downward sliding of the capacitor section within the chute, the gate member 303 being mounted on bracket 305 carried by the lower end of lever 306, which, in turn, is pivoted at 307 on chute 302, with the upper end of the lever being connected to the flexible shaft 60 coming from the power drive source.

Mounted on lever 306 at a distance from gate member 303 greater than the length of one capacitor section is a spring clamping finger 308, adapted to engage and hold a capacitor section 14 when moved downwardly thereagainst.

When the flexible shaft 60 moves upwardly, the lever 306 will rotate in a clockwise direction, as seen in FIG. 27, so that the spring finger 308 engages and holds the capacitor section thereunder. Further rotation of lever 306 lowers the gate member 303 from stopping engagement with the lowermost capacitor section in the chute 302, which then slides freely down the chute. The next higher capacitor section 14 is held by spring finger 308 and remains stationary. Reverse movement of flexible shaft 60 reverses the process, first moving the gate member 303 upwardly into stopping position, and then releasing the spring clamp 308 so that the capacitor sections within the chute may slide down against the stop member 303. Thus, for each reciprocation of shaft 60, one capacitor section will be released for free movement down the chute.

Mounted in fixed relation to frame 301 is a shaft 310 having at its outer end a stub shaft 311 rotatably journaled therein. A support arm 312, fixed to stud shaft 311, is provided with an outwardly extending spring finger 313 having a V-shape and being adapted to receive a capacitor section thereon as it slides down the chute 302. A torsion spring 314 connected to the support arm 312 and collar 315 fixed to shaft 310 biases the support arm in an upward direction relative to the chute 302.

In a similar manner, a shaft 316 is fixed to the frame 201a of the transfer unit 200a, so as to be coaxial with and spaced from shaft 310, to rotatably support therein and spaced from shaft 310, to rotatably support therein a stub shaft 317 having support arm 318 fixed thereon. A spring finger 319, similar to 313, is mounted on support arm 318 to support a capacitor section thereon.

Pin 320 fixed to support arm 312 extends outwardly therefrom so as to engage the bottom of support arm 318, to transmit the rotational torque of torsion spring 314 to support arm 318, urging this arm in a counterclockwise direction, as seen in FIG. 31, until the pin 321, fixed to stub shaft 317 and riding within slot 322 on shaft 316, engages the upper end 323 of slot 322.

The length of pin 320 enables the shafts 310 and 316 fixed relative to frames 201 and 201a, respectively, to be moved towards and away from each other when the machine 10 is adjusted for different size capacitor sections while yet retaining the engagement between pin 320 and support arm 318.

In operation, as a capacitor section 14 is released from the stop member 303, it slides down the chute 302 and is projected against the roughened face of loading finger 261a, and falls to rest on the support fingers 313 and 319, which are upwardly biased by torsion spring 314 to the position as shown in FIG. 31. As has been described, the loading fingers 261 and 261a move together to clamp the capacitor section 14 therebetween, the loading fingers being then rotated to carry the clamped section away from the capacitor feed unit 300. During this movement, the support arms 312 and 318 yield downwardly against the bias of torsion spring 314 to allow the capacitor section 14 to be removed by the loading fingers, the support arms springing back to their initial position after the capacitor section has been removed therefrom, to be positioned to receive the next capacitor section.

*The Holding Unit*

In general, the holding unit 400 comprises a pair of holding jaws adapted to receive the capacitor sections from the loading fingers and to hold the capacitor sections during the soldering operation. During this soldering, the holding unit rotates the held capacitor section about its own axis to cause an abrasion between the soldering head and the capacitor section to remove oxides and form a more perfect solder joint.

Referring now to FIGS. 32 and 33, the holding unit comprises a frame member 401 mounted on and fixed to the main frame 11 of the machine 10. Two pintles 402 and 403 are mounted in frame 401 to serve as fixed pivot points for link members 404 and 405, respectively. A first pair of links 406 and 407, joined together by spacing blocks 408 and 409, are pivotally connected to link members 404 and 405 on pintles 411 and 412, respectively. Similarly, a second pair of links 413 and 414, joined together by spacing blocks 416 and 417, are pivotally connected to link members 404 and 405 on pintles 418 and 419, respectively.

Pivotally mounted to the upper ends of the link pairs 406, 407 and 413, 414, by pintles 421 and 422, are a pair of mounting plates 423 and 424. A lower holding arm 426 is confined between plates 423 and 424, and is pivotally mounted on pintle 421; and an upper holding arm 427 is similarly confined between plates 423 and 424, and is pivotally mounted on pintle 428 extending therebetween. Meshed gear segments 429 and 430, on holding arms 426 and 427, respectively, are employed to obtain equal and opposite rotation of the holding arms about their pivot points 427 and 428, and a tension spring 431 normally biases the holding arms so that the clamping jaws 432 and 433 on the outer ends thereof are normally urged towards one another. The opposed faces of the jaws are each V-grooved longitudinally thereof as at 434 and 435 to enable a capacitor section to be held there-between, with the axis of such capacitor section being coaxial with the clamping center of the jaws 432 and 433.

When the jaws 432 and 433 are clamped onto a capacitor, as shown in FIG. 32, the sub-assembly of the two holding arms 426 and 427, and the two plates 423 and 424, may be considered as a single link member, pivoted to the link pairs 413, 414 and 406, 407 on pintles 421 and 422, respectively.

The geometrical configuration of the above linkage system is such that the lines extending through (1) the pintles 403 and 412, (2) the pintles 402 and 411, and (3) the clamping center of clamping members 432 and 433 and the pintle 422, are all parallel to one another. Also, the lines extending through (1) the pintles 402 and 403, (2) the pintles 421, 418 and 419, and (3) the pintles 422, 411 and 412, are each parallel to one another. Furthermore, the clamping center of clamping members 432 and 433 lies on an extension of the line between the fixed pintles 402 and 403.

The linkage assembly is connected at 436 to the reciprocating connecting rod 43 from the power drive unit. FIG. 32 shows the initial position of the linkage assembly, generally indicated by the reference numeral 437 and shown in solid lines. When the connecting rod 43 moves upwardly, the linkage system will be pivoted around the fixed pivot points 402 and 403, and moved to the dotted line position, identified as 437'. With the geometrical configuration as set forth above, the holding arms 426 and 427 will be rotated to the positions as indicated by 426' and 427' such that the clamping center therebetween remains fixed in space, and thus the capacitor section 14, held by the clamping members 432 and 433, will be rotated about its axis which is coaxial with the clamping center of the jaws of the holding arms.

Reverse or downward movement of connecting rod 43 reverses the rotation of the capacitor section 14 about its axis, until the linkage system 437 returns to its initial position.

The holding arms 426 and 427 are adapted to be opened when the linkage system is in its initial position, in the following manner. The holding arm 426 is extended backwardly at 438 and carries a pin member 439 adapted to be engaged by one end of lever member 440 pivoted at 441 to frame 401 and connected at the other end thereof to the reciprocating connecting rod 54. When the connecting rod 54 moves downwardly from the solid line position of FIG. 33, the lever member 440 rotates in a clockwise direction, engaging pin 439 and forcing the holding arm 426 to rotate about pintle 421 in a counterclockwise direction, against the bias of spring 431, to the position indicated by reference numeral 426''. At the same time, the rotational movement of holding arm 426 will be transmitted through the meshing gear segments 429 and 430 to cause the holding arm 427 to rotate about pintle 428 in a clockwise direction, to the position indicated at 427''. Upward movement of connecting rod 54 back to its initial position reverses the above movements of lever 440 and holding arms 426 and 427 so as to allow the holding arms to close by the force exerted by spring 431, to the solid line position of FIG. 33.

In the operation of the soldering machine 10, the holding arms are held in their open position by connecting rod 54 while the loading fingers 261 and 261a carry a capacitor section 14 from the capacitor section feed unit 300 to their final position illustrated in FIG. 23. The connecting rod 54 is then moved upwardly, allowing the holding arms to close upon the capacitor section to clamp such section therebetween. The connecting rod 43 is next moved upwardly to rotate the clamped capacitor section about its axis, and then moved downwardly to rotate the capacitor section in the opposite direction about its axis. The cycle of operation is completed by lowering the connecting rod 54, to open the holding arms so that the capacitor may be removed therefrom.

FIG. 34 illustrates the position of the capacitor section 14 and the wire pigtails 13' when at the holding unit.

*Solder Head Unit*

In general, the solder head unit 500 comprises a solder head mounted on a carriage for movement transversely and longitudinally of the machine, so that the solder head may be caused to move through a rectangular path relative to the machine. The solder head is provided with a V-shaped notch so that when the wire pigtail is placed against the end of the capacitor unit at the soldering station, the solder head may be moved against the capacitor unit end with the wire pigtail received within the notch of the solder head. With the solder head in engagement with the capacitor section and pigtail, a measured amount of molten solder is forced through the solder head to be applied to the capacitor section end. The solder head is then removed from the soldered connection so that it may cool and the finished product is then carried to the discharge chute.

Referring now to FIGS. 35–37 and 39, the soldering head 501 is of the type disclosed in my copending application Serial No. 609,788, and comprises a flat faced head portion 502 and a backwardly extending cylindrical portion 503, with an internal passage 504 therethrough, the passage being restricted at 505 to form a discharge orifice. The soldering head 501 is preferably formed from a refractory or ceramic material having an inherent roughness of surface, such as disclosed in my prior application, so that the soldering face 506 will have an abrading action on the material to be soldered. The internal passage 504 is ground and polished to provide a completely smooth bore. To increase the abrading action, and to provide for solder distribution from the discharge orifice 505, a plurality of grooves 507 are formed on the soldering face 506. The soldering head 501 is notched at 508 to enable the soldering head to embrace the wire pigtail 13' in the base of the notch when the soldering head is moved thereagainst. Two electrical heating units, 509 and 510, are disposed within the head portion 502 to heat the head to a temperature considerably above the melting point of the solder employed; as, for example, the solder employed melts at about 650° F. and the soldering head is heated to approximately 900–1000° F.

The soldering head 501 is held by a plurality of cooling fins 511 mounted on bolts 512 and carried by mounting block 513. Screw members 514 enable the fins 511 to be tightly clamped onto the cylindrical portion 503 of the soldering head 501 so as to firmly grip the soldering head and to insure good heat transfer therebetween. A solder feed tube 515 extends through mounting block 513 and is received within the passage 504 of the soldering head 501 to enable the solder wire 15 to be introduced into the passage 504.

The mounting block 513 is supported on posts 516 and 517 and clamped thereto by setscrews 518 at a desired height. Referring now to the exploded view of FIG. 39, the posts 516 and 517 are fixed to bracket 519 which is secured by bolt 520 to bracket 521. Slots 522 and 523 in bracket 519 allow a limited pivotal movement of bracket 519 relative to bracket 521, around bolt 520, for adjustment purposes, the two brackets being clamped to one another when adjusted by bolts 524 and 525.

Bracket 521 is adapted to be adjustably fixed relative to the upper slide member 526 by means of the pivotal mounting of bracket 521 on the upstanding brackets 527 and 528 fixed to slide member 526. A setscrew 529 carried by bracket 521 engages the upper surface of slide member 526, and, when adjusted to the desired height, the bracket 521 is rigidly secured to slide member 526 by bolt 530.

The lower surface of slide member 526 is provided with a dovetail groove 531 adapted to slide longitudinally of the machine 10 along dovetail 532 formed on member 533 rigidly fixed to the bottom slide member 534. This latter member is also formed with a dovetail groove 535, at right angles to dovetail groove 531, adapted to slide transversely of the machine 10 on dovetail 536 formed on member 537. This last member is rigidly fixed to tray 12 by means of bolts 538 extending through tray 12 and received in retainer plate 539.

The bottom slide member 534 is connected to link 48 reciprocated by crank 47 to provide a reciprocatory movement of the bottom slide member and, consequently, the soldering head 501 transversely of the machine 10.

A reciprocatory movement of the upper slide member, longitudinally of the machine 10, is obtained by means of link 540, pivotally connected at one end thereof to ear 541 of the upper slide member 526. The other end of link 540 is pivotally connected at 542 to crank 108 (FIG. 5) so that as the connecting rod 37 moves downwardly, the pivot point 542 on crank 108 will move downwardly and to the right, the rightward movement thereof being transmitted through link 540 to the upper slide member 526, to move the soldering head 501 towards the capacitor section 14 held by the holding unit 400. Reverse, or upward, movement of connecting rod 37 reverses the movement of link 540, to move the upper slide member 526 and the soldering head 501 away from the capacitor 14.

In the operation of the mechanism described above, a cycle of operation will begin with the upper and lower slide members 526 and 534 moved to a position such that the soldering head 501 is positioned to the rear and to the left of the capacitor section 14 held by the holding arms of the holding unit 400. At this time, the capacitor section 14 will be clamped and held in place by the holding means 400, and the pigtail 13' will have been transferred by the transfer arm 236 so that the loop on the end of the pigtail is adjacent the end of the capacitor section 14.

The upper slide member 526 is now moved forwardly until the rear of the notch 508 on the soldering head 501 is against the pigtail 13'. The lower slide member 534 is then moved so that the soldering head moves against the end of the capacitor section, such movement also insuring that the loop on the end of the pigtail is firmly pressed against and slightly into the end of the capacitor section.

The solder 15 is now advanced through the solder feed tube 515, in a manner to be hereinafter described, and into the central passage 504 of the soldering head 501. Such movement forces an amount of molten solder through the orifice 505 and against the capacitor section, the solder being distributed thereon through the grooves 507.

As brought out in my copending application, above referred to, the solder within the soldering head passage 504 is maintained in a molten state near the face of the soldering head orifice 505 by the heating units, with the cooling fins 511 serving to dissipate heat from the cylindrical portion 503 so that the solder will be in a solid state at that point. As the solder is fed through the passage 504, the advancing solid solder will act as a piston to force molten solder from orifice 505. At the same time, the molten solder will backflow around the advancing solder and resolidify therearound to provide a constantly renewing seal between the solid solder and the walls of the passage 504. The advanced solder will be quickly melted by the high temperature of the soldering head so that a constant supply of molten solder will be maintained in the solder passage 504.

It is at this time that the capacitor section 14 is rotated by the holding unit 400, so that the oxides on the contacting surfaces of the wire pigtail and the capacitor section may be scraped from these surfaces to expose the virgin metal thereunder to the solder. The wire loop on the pigtail is pressed into the end surface of the capacitor section so that the soldering head face 506 engages the foil end of the capacitor section, and the rotation of the section also causes the abrasive face and grooves of the soldering head to remove the oxides from the capacitor section.

After the capacitor section has completed its rotation, the soldering head is moved therefrom by the leftward movement of the lower slide member 534, to permit the solder to harden and complete the soldering operation. The soldering head is then moved by the upper slide member 526 back to its initial position, and the soldered capacitor and pigtail assembly is removed from the holding unit 400 to be carried to the discharge trough 253.

*The Solder Feed Unit*

In general, the solder feed unit 600 operates to feed a predetermined amount of solder to the soldering head during the portion of each cycle of operation when the soldering head is in contact with the capacitor section, and comprises in general two feed rollers adapted to engage the solder therebetween so as to feed the solder forwardly when rotated.

One of these rollers is rotated a fixed amount when the soldering head is in contact with the capacitor section to feed a measured amount of solder to the soldering head, with the other roller operating as an idler roller during this interval. The amount of rotation of the first roller may be varied, as desired, so that differing measured amounts of solder may be fed thereby, in accordance with the requirements for any particular size capacitor section.

It has been found that commercial grade solder contains various impurities therein, and under continual operation these impurities will collect in the soldering head and will eventually clog the soldering head passage. Accordingly, the present solder feed mechanism is actuated to intermittently purge the soldering head by forcing the molten solder therein to discharge the impurities from the soldering head. This is accomplished by causing the second roller to advance the solder to the soldering head, with the first roller operating as an idler roller at that time, at a portion of the cycle of operation of the soldering head when the latter is out of engagement with the capacitor section.

Referring now to FIGS. 35, 36, 38 and 40–44, the solder feed unit 600 is mounted on a frame member 601 fixed to bracket 519 for movement therewith.

A first feed roller 602 is mounted on the driven portion 603 of a conventional one-way clutch 604, the driving portion of which is fixed to a shaft 605 journaled in frame 601. Such one-way clutches as used herein will transmit rotation of the driving portion to the driven portion when the driving portion rotates in one direction, but will allow the driven portion to remain stationary when the driving portion is rotated in the opposite direction. Clutch 604 is a clockwise-engaging clutch, causing feed roller 602 to rotate in a clockwise direction, as seen in FIG. 36, when the shaft 605 is rotated in a clockwise direction, but with the feed roller disengaged from the shaft 605 as the latter rotates in a counterclockwise direction.

A second feed roller 606 is mounted on the driven portion of a counterclockwise-engaging one-way clutch 607, the driving portion of which is fixed to shaft 608 journaled in bracket 609. This bracket is pivotally mounted at 610 to frame 601 and is biased by spring 611 confined between the bracket 609 and support member 612 integral with frame 601 to force feed roller 606 against feed roller 602. A solder feed guide 613 mounted in support member 612 receives the solder 15 and directs the solder to the opposed feed grooves 614 and 615 formed peripherally of the feed rollers 602 and 606. The solder fed by the feed rollers then enters the solder feed guide 515 and is fed to the soldering head 501.

A manually operable knob 616 is keyed to feed roller 606 to enable the solder to be fed thereby by hand, if desired, as for example, in the setting up of the machine.

Flexible shaft 61, from the power drive unit, supplies a constant amount of reciprocatory movement thereof to drive the feed rollers 602 and 606 in the following manner. Mounted on the lower end of the driving shaft 605 of the feed roller 602 is a crank arm 617 fixed thereto, and a triangular plate member 618 freely journaled thereon, the plate member being pivotally connected at 619 to the reciprocatory drive shaft 61.

An adjustment lever 620, pivotally connected at 621 to frame member 601, carries at its other end a threaded member 622 extending upwardly through arcuate slot 623 in the frame. The adjustment lever may thus be rotated about its pivot point 621 within the amount allowed by the length of slot 623, with the manually operable knob 625 being screwed down on the threaded member 622 to clamp the adjustment lever 620 to frame 601 at any desired point to which the lever is set.

Three link members complete this portion of the linkage system, link 629 being pivotally connected at 630 to the triangular plate member 618, link 631 being pivotally connected at 632 to adjustment lever 620, and link 633 being pivotally connected at 634 to crank arm 617, each of the links 629, 631 and 633 being pivotally connected at their other ends to a common pintle 635. The links 631 and 633 are equal in length to one another.

Figure 40:
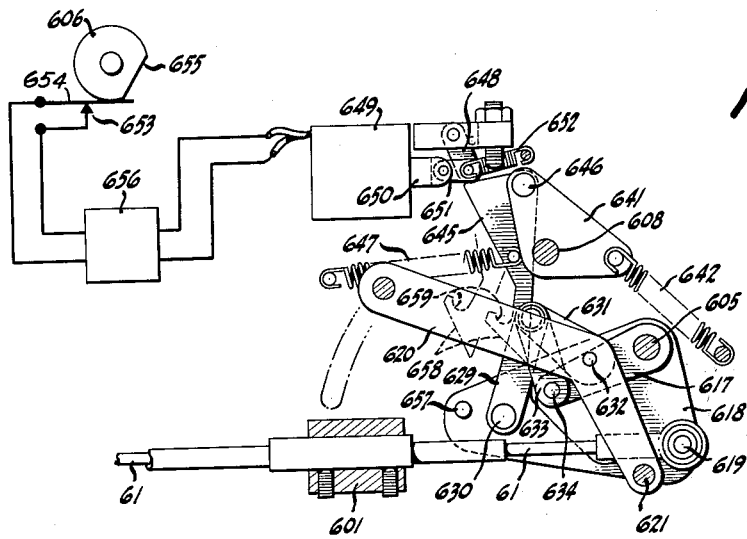
Figure 41:
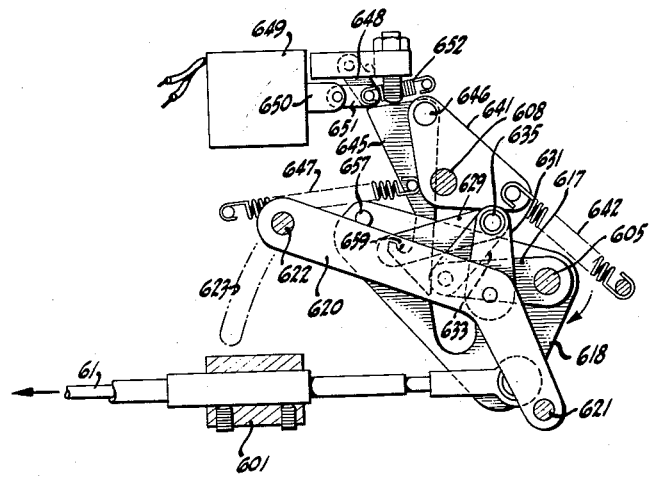

The manner in which the reciprocatory motion of flexible shaft 61 is converted into angular rotation of feed roller shaft 605 by the above described linkage is illustrated in FIGS. 40 and 41. As the drive shaft 61 moves to the left, it pulls on the triangular plate member 618, rotating this in a clockwise direction about shaft 605. This rotation forces the interconnected links 629 and 631 to move so that their common pintle 635 travels in a clockwise direction about the pivot point 632 which is fixed relative to frame member 601 by the securing of adjustment lever 620 thereto. The movement of the pintle 635 is transmitted through link 633 to pull the crank arm 617 fixed on shaft 605 in a clockwise direction, thereby moving the feed roller 602 in an angular amount of clockwise rotation equal to the angular rotation of crank arm 617.

Reverse movement of flexible shaft 61; i.e. to the right, returns the linkage system to its initial position shown in FIG. 40. During this return travel, the shaft 605 is disengaged from the feed roller 602 by the one-way clutch 604.

Figure 42:
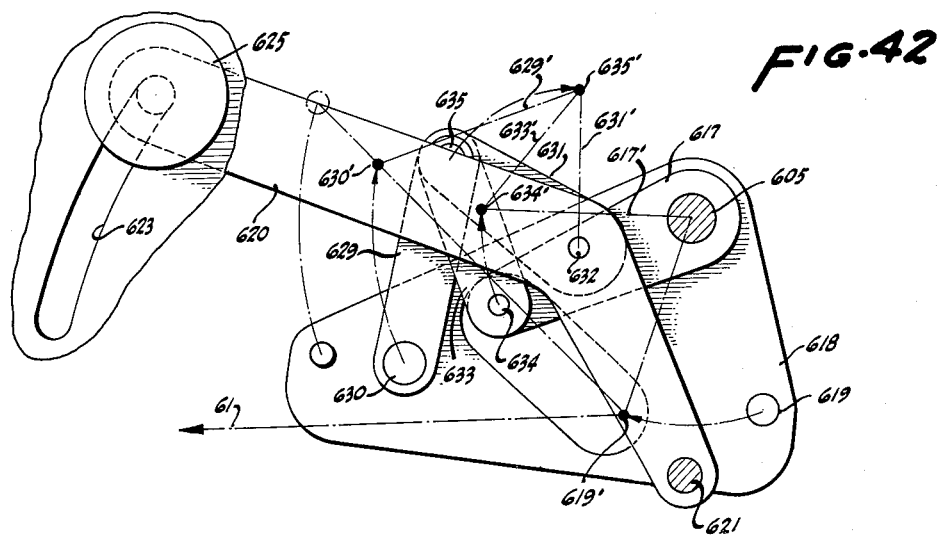
Figure 43:
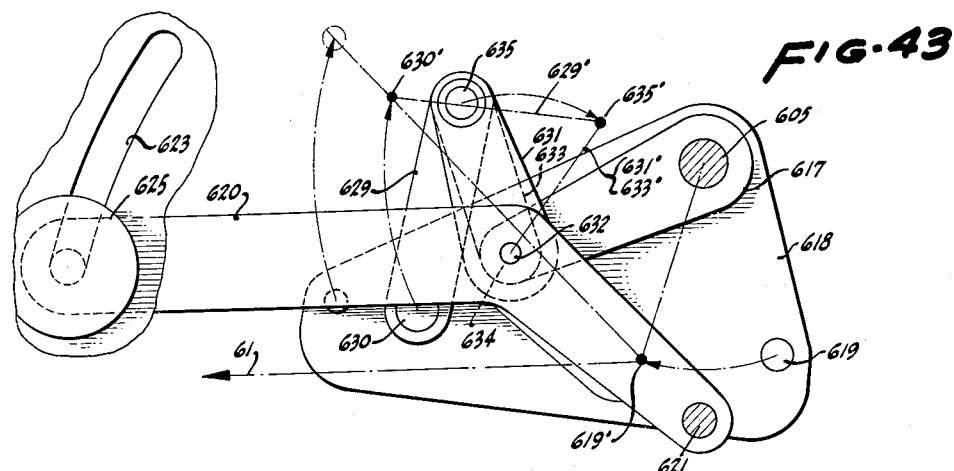
Figure 44:
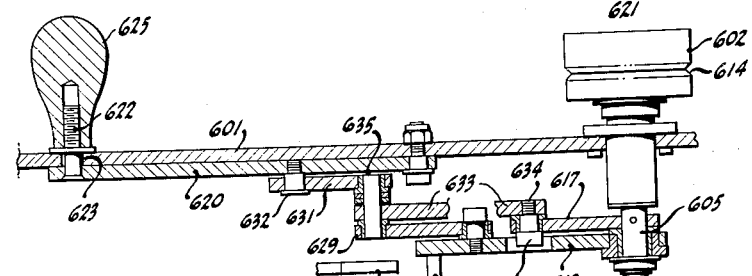

FIGS. 42 and 43 illustrate the adjustment of the amount of feed roller rotation by the reciprocation of flexible shaft 61, FIG. 42 showing the adjustment lever 620 as moved to the maximum feed position, and FIG. 43 illustrating the adjustment lever 620 as moved to the minimum, or zero, feed position.

FIG. 42 represents the linkage system with the elements thereof shown in the initial position of FIG. 40, with the position of FIG. 41 indicated by dot and dash lines and primed reference numerals. As previously described, the amount of clockwise rotation of shaft 605 is equal to the amount of angular movement of crank arm 617 and pivot point 634 thereon to the positions indicated as 617′ and 634′.

FIG. 43 is similar to FIG. 42, and illustrates the linkage system when the adjusting lever 620 is moved to the zero feed position. At this point, the pivot point 632 thereon is moved so as to directly overlie the pivot point 634, so that links 631 and 633 overlie one another. As the triangular plate member 618 is rotated in a clockwise direction, pivot point 630 thereon will again be translated to the position 630′, with link 629 and pintle 635 moved to the position 629′ and 635′, respectively. However, links 631 and 633 will now be rotated in unison since they are pivotally connected to one another at one end by the vertically extending pintle 635 and their other ends are pivotally connected on vertically coaxial pivot points. Since the pivot point 632 of link 631 is fixed relative to the frame member 601, the pivot point 634 does not move relative thereto, and no rotative movement is produced in crank arm 617, shaft 605 or feed roller 602, by the reciprocatory movement of flexible drive shaft 61.

The amount of rotative movement of shaft 605 and feed roller 602 may be varied between the extreme positions illustrated in FIGS. 42 and 43 by moving the adjustment lever 620 to any desired point along slot 623 and clamping it to the frame member 601 at that point.

As has been mentioned, it is desirable to periodically purge the soldering head 501 of impurities by forcing a portion of solder therethrough to discharge the accumulated impurities. This purging is accomplished by the following mechanism. Fixed to the lower end of driving shaft 608 of feed roller 606 is a triangular plate member 641, biased by spring 642 in a clockwise direction so that pin 643 fixed to shaft 608 normally rests against stop member 644 secured to bracket 609. A latch member 645 is pivotally mounted at 646 to plate member 641 and is urged in a clockwise direction by spring 647. Such movement of the latch member is normally prevented by the engagement thereof with the pivotally mounted stop link 648. A solenoid 649 has the plunger 650 thereof pivotally connected by link 651 to the stop link 648, so that when the solenoid is energized, the plunger thereof may move the stop link 648 out of engagement with the latch member 645. Spring 652 returns the stop link 648 to its normal position upon deenergization of the solenoid 649.

A microswitch 653 secured to frame member 601 is provided with a movable switch arm 654 extending into tangential engagement with feed roller 606, the latter being cut away at 655 so that for each rotation of the feed roller 606, the switch member 654 actuates the microswitch 653. These intermittent actuations of the microswitch cause incremental advance of a conventional stepping switch 656 so that when a predetermined number of revolutions of the feed roller 606 have occurred, the stepping switch 656 will close to energize the solenoid 649 of the purging system.

As set out above, the energization of the solenoid 649, in response to the predetermined number of revolutions of feed roller 606, releases the latch member 645 for clockwise rotation thereof under the bias of spring 647, to the dotted line position illustrated in FIG. 40. The next movement of the plate member 618 by flexible shaft 61 will cause the pin 657 thereon to move against the inclined face 658 of the latch member, camming the latch member out of the path of pin 657. The pin will be moved past the hook portion 659 of the latch member 645, and spring 647 will then move the hook portion 659 into the path of return movement of pin 657.

As the drive shaft 61 returns the triangular plate member 618 to its initial position, the pin 657 thereon will pull on latch member 645, causing triangular plate 641 and shaft 608 to rotate in a counterclockwise direction. This rotation is transmitted through the one-way clutch 607 to feed roller 606, causing an advance of the solder 15 thereby. As has been explained, the feed roller 602 is disengaged from its drive shaft 605 at this time, and thus is free to rotate as an idler roller for feed roller 606. The purging operation occurs in timed relation to the operation of the machine at a time when the soldering head 501 is out of engagement with the capacitor section, and thus the impurities are discharged at a time other than in an actual soldering operation.

The next cycle of operation again rotates the triangular plate member 618, causing the feed roller 602 to advance the solder for a soldering operation, and causing the pin 657 to move so as to allow spring 642 to return plate member 641 and latch member 645 to their initial positions. The solenoid 649 has been deenergized during the purging operation, allowing the stop link 648 to move into a position to engage latch member 645 on its return. This engagement rotates the latch member against the bias of spring 647 so that the hook member 659 moves away from the path of movement of pin 657 and thus disables the purging mechanism until the next purging cycle. It is to be noted that the purging operation occurs between two successive soldering operations, so that additional time in the operation of the machine is not required for purging.

The amount of solder fed to the soldering head in a purging operation is constant, and not dependent on the setting of the adjustment lever 620, and is of an amount sufficient to force all of the molten solder within the soldering head passage from the discharge orifice thereof. The purging solder is quickly melted before the next normal soldering operation so that the normal soldering cycle is not interrupted.

*Adjustment of the Trays*

As has been mentioned, the trays 12 and 12a are adjustable longitudinally of the machine 10, enabling the machine to operate on capacitors of different lengths.

Referring now to FIGS. 45 and 48, each tray 12 and 12a is comprised of a flat upper plate 701 and a flat lower plate 702, with spaced stiffening bars 703 therebetween and extending transversely of the machine, the plates and bars being connected together to form a rigid tray member. Each tray rests on an H-shaped beam 704 rigidly fixed to frame 11 and extending longitudinally thereof. Depending from the lower plate member 702 is a pair of guide members 705 and 706 embracing the outwardly extending flanges 707 and 708 of beam 704, which serve as a trackway for tray 12.

Each tray is provided with means to lock the tray to the trackway comprising a hub 710 fixed to plate 702 having screw member 711 extending therethrough, the latter being provided with a collar 712 preventing downward movement thereof and a manually operable handle 713. The lower end of screw member 711 is threadedly engaged with keeper plate 714 engageable with the inwardly extending flanges 715 and 716 of the H-beam 704. When the tray 12 is moved along the beam 704 to the desired position, the handle 713 is manually rotated to screw the keeper plate 714 up against the H-beam flanges 715 and 716 to lock the tray 12 against further movement.

The trays 12 and 12a are moved in equal and opposite directions relative to the H-beam 704 by the manually operable handle 720 fixed to the upper end of shaft 721, which, when rotated, will cause rotation of bevel gear 722 to rotate the bevel gears 723 and 723a in mesh therewith. Screw members 724 and 724a are coupled to the gears 723 and 723a, respectively, and are in threaded engagement with bracket members 725 and 725a secured to trays 12 and 12a. As the gears 723 and 723a rotate, they will cause the trays 12 and 12a to be screwed onto or off of the rotating screws 724 and 724a in equal and opposite directions.

FIG. 46 illustrates the manner in which the crank 47, furnishing the transverse movement to the soldering head unit 500, is movable with tray 12 along the jackshaft 46. A double armed bracket 731 secured to tray 12 embraces crank 47 to move the crank with movement of the tray. The jackshaft 46 is longitudinally grooved at 732, enabling the key 733 on crank 47 to slide therein.

*Synchronization of the Machine Components*

In the foregoing description, the operation of the individual components of the various units has been described. FIG. 49 illustrates the timed sequence of operation of each component in relation to the other components of the machine so that for a single revolution of the main drive camshaft 21, each component will perform its operation, and a completed soldered capacitor will be discharged from the machine. It is believed that FIG. 49 is largely self-explanatory; each of the horizontal lines representing one of the cams 23–28 mounted on camshaft 21, with the darkened portions of these lines indicating the periods of movement of their respective cam followers, and the light portions representing the periods of dwell of the cam followers. The reference number in paretheses after the description of operation of each component refers to the connecting rod or flexible shaft which delivers the reciprocatory motion from the drive unit to the particular component.

In ordinary soldering methods, the highest temperatures of the soldering head are kept at a value not much higher than the working temperature of the solder, so as to reduce the tendency of the molten solder (which is normally exposed to the air) to oxidize. This necessity for a relatively low temperature requires a prolonged contact between the soldering head and the metal being soldered. When such contact occurs initially, the heat extracted by the metal from the head causes the temperature at the point of contact to drop, possibly even below the working temperature of the solder. Only when enough heat has flowed to the point of contact from other parts of the soldering tip, and the metal to be soldered has, as a whole, been raised to the soldering temperature, can the actual soldering proceed.

However, it is to be noted that the apparatus disclosed in the present application provides a relatively large area soldering head which effectively sandwiches the molten solder between the head and the working surface, thus effectively shielding the molten solder from contact with the oxidizing air. Also, the solder is maintained in a molten condition in the soldering head before it is used, the solder in the head also being protected from the air until it is needed for a soldering operation. Since the solder is thus protected from the air before and during the soldering operation, the soldering head can be held at a temperature substantially higher than the melting point of the solder, although such a temperature would be intolerably high for a conventional soldering operation. Thus, when contact with the capacitor section to be soldered is first made, the interface surface, though instantaneously lower than the average head temperature, can nevertheless be at, or well above, the required working temperature of the solder. Therefore, the sequence of operation (involving contact, solder feeding, abrasion, and removal of the head) can be conducted with great rapidity, and a sound soldered joint can be produced because the temperature of the soldered surface is adequately high throughout the process. High speed operation is of course advantageous in automatic or mechanized soldering operation.

Another important benefit accruing as a result of using a very high soldering temperature and a short contact time is that very little heat is conducted to the capacitor section being soldered, so that as a whole, such section remains at a relatively low temperature although the area being soldered is higher than the working temperature of the solder. When the head is removed after the soldering operation is completed, the small amount of heat concentrated at the interface is rapidly conducted and dissipated into the relatively cool body of the capacitor section. Thus, the working surface and the solder thereon is rapidly cooled to a temperature below the solidus of the solder, and the soldered joint is solidified with great speed. It follows that the shorter the contact between the head and the surface, the more rapid the cooling when the head is removed.

As an illustration of the results obtainable by the present invention, the soldering of pigtails to aluminum foil capacitor requires a solder having a working temperature of about 650° F. In a hand operation using a conventional soldering head, approximately seven seconds is required to bring the joint to a suitable soldering temperature and to complete a joint. However, in the use of the disclosed apparatus and method, it is possible to hold the temperature of the soldering head at 900–1000° F., whereby the same joint may be completed in approximately a half second.

Since the time required for a soldering operation is in the order of about a half second, the machine has been designed so that a complete cycle of operation will be performed in approximately two seconds. Thus, in FIG. 49, the 360° of rotation of each cam 23 through 28 will take place in two seconds, and a completed soldered capacitor will be discharged therefrom on each cycle of operation of the machine.

It is to be understood that the form of the invention herewith shown and described is to be taken as a preferred embodiment of the invention, and that various changes in the shape, size and arrangement of parts may be resorted to without departing from the spirit of the invention or the scope of the attached claims.

Having thus described my invention, what I claim and desire to secure by Letters Patent is:

1. A soldering machine comprising a pair of jaw members, means for periodically inserting a tubular capacitor section in said jaw members to be held thereby during a pigtail soldering operation, means for simultaneously positioning pigtail leads having looped ends thereon adjacent each end of said capacitor section, a pair of soldering heads having directionally opposed soldering faces movable against opposite ends of said capacitor section, means for injecting a measured amount of solder between said soldering heads and respective ends of said capacitor section, and means for moving said soldering heads toward and away from said capacitor section while said section is held by said jaw members.

2. A soldering machine comprising a pair of jaw members, means for periodically inserting a tubular capacitor section in said jaw members to be held thereby during a pigtail soldering operation, means for simultaneously positioning pigtail leads having looped ends thereon adjacent each end of said capacitor section, a pair of soldering heads having directionally opposed faces movable against opposite ends of said capacitor section, means for injecting a measured amount of solder between said soldering heads and respective ends of said capacitor section, means for rotating said jaw members while said soldering heads are in engagement with said capacitor section ends, and means for moving said soldering heads toward and away from said capacitor section while said section is held by said jaw members.

3. A soldering machine comprising: a pair of jaws; means for inserting a capacitor section into said jaws to be gripped thereby; means to position a pigtail lead having a looped end with the looped end in adjacency to one end of the gripped capacitor section; a soldering head having a notch adapted to embrace the shank of said pigtail; means to move said soldering head against said end of the gripped capacitor section; means to inject a quantity of solder between said soldering head and said capacitor section end; means to rotate said jaws and said capacitor section while said soldering head is held thereagainst; and means to remove said soldering head from engagement with said capacitor section end after the rotation thereof, said pigtail positioning means carrying the soldered pigtail and capacitor section from said jaws to a discharge point.

4. A soldering machine comprising a pair of rotatable jaw members, means to insert a capacitor section in said jaws, a looping means for forming a loop on the end of a wire, means to straighten and advance said wire a measured amount through said looping means, means to shear said advanced wire and to carry said sheared wire into adjacency with said capacitor section with the looped end of said wire positioned against an end of said capacitor section, a soldering head having a notch adapted to embrace the shank of said sheared wire, means to move said soldering head into engagement with said capacitor section end, solder feeding means for injecting a measured quantity of solder between said solder head and said capacitor section end, means to rotate said jaw members while said soldering head is in engagement with said capacitor section end, means to move said soldering head out of engagement with said capacitor section to allow said solder to solidify, and means to remove said soldered capacitor from said jaw members.

5. A soldering machine comprising a pair of rotatable jaw members, means to insert a capacitor section in said jaws, a looping means for forming a loop on the end of a wire, means to straighten and advance said wire a measured amount through said looping means, means to shear said advanced wire and to carry said sheared wire into adjacency with said capacitor section with the looped end of said wire positioned against an end of said capacitor section, a soldering head having a notch adapted to embrace the shank of said sheared wire and a roughened face adapted to engage said capacitor section end, means to move said soldering head into engagement with said capacitor section end, solder feeding means for injecting a measured quantity of solder between said solder head and said capacitor section end, means to rotate said jaw members while said soldering head is in engagement with said capacitor section end, means to move said soldering head out of engagement with said capacitor section to allow said solder to solidify, and means to remove said soldered capacitor from said jaw members.

6. A soldering machine comprising a pair of rotatable jaw members, means to insert a capacitor section in said jaws, a looping means for forming a loop on the end of a wire, means to straighten and advance said wire a measured amount through said looping means, means to shear said advanced wire and to carry said sheared wire into adjacency with said capacitor section with the looped end of said wire positioned against an end of said capacitor section, a soldering head having a notch adapted to embrace the shank of said sheared wire, means to move said soldering head into engagement with said capacitor section end, solder feeding means for injecting a measured quantity of solder through said soldering head to between said solder head and said capacitor section end, means to rotate said jaw members while said soldering head is in engagement with said capacitor section end, means to move said soldering head out of engagement with said capacitor section to allow said solder to solidify, means to remove said soldered capacitor from said jaw members, and means to periodically advance solder through said soldering head when said soldering head is out of engagement with a capacitor section to purge said soldering head of impurities.

7. A soldering machine comprising a power drive unit having a cycle of operation, a pair of jaw members, means connected to said power drive unit to insert a capacitor section in said jaws once for each said cycle of operation, looping means connected to said power drive unit for forming a loop on the end of a wire, wire feeding means connected to said drive unit to straighten and feed said wire a measured amount through said looping means once for each said cycle of operation, means connected to said power drive unit to shear said advanced looped wire and to carry said wire into adjacency with said capacitor section held by said jaw members with the looped end of said wire positioned against an end of said capacitor section, a soldering head having a notch adapted to embrace the shank of said positioned wire, means connected to said drive unit to move said soldering head into engagement with said capacitor section end, means connected to said power drive unit for feeding a measured amount of solder through said soldering head to between said soldering head and said capacitor section end, means connected to said power drive unit for rotating said jaw members while said soldering head is in engagement with said capacitor section end, means connected to said power drive unit for removing said soldering head from engagement with said capacitor section end after the rotation thereof, and means connected to said power drive unit for removing said soldered capacitor section from said jaw members.

8. A soldering machine comprising a power drive unit having a cycle of operation, a pair of jaw members, a supply source of capacitor sections, means connected to said power drive unit to release a capacitor section once for each said cycle of operation from said supply source, means connected to said power drive unit to insert said released capacitor section in said jaws, means connected to said power drive unit to position a wire having a looped end in adjacency with said capacitor section held by said jaw members with the looped end of said wire positioned against an end of said capacitor section, a soldering head having a notch adapted to embrace the shank of said positioned wire, means connected to said drive unit to move said soldering head into engagement with said capacitor section end, means connected to said power drive unit for feeding a measured amount of solder through said soldering head to between said soldering head and said capacitor section end, means connected to said power drive unit for rotating said jaw members while said soldering head is in engagement with said capacitor section end, means connected to said power drive unit for removing said soldering head from engagement with said capacitor section end after the rotation thereof, and means connected to said power drive unit for removing said soldered capacitor section from said jaw members.

9. A soldering machine comprising a power drive unit having a cycle of operation, a pair of jaw members, means connected to said power drive unit to insert a capacitor section in said jaws once for each said cycle of operation, looping means connected to said power drive unit to form a loop on the end of a wire, wire feeding means connected to said drive unit to straighten and feed said wire a measured amount through said looping means once for each said cycle of operation, means connected to said power drive unit to shear said advanced looped wire and to carry said wire into adjacency with said capacitor section held by said jaw members with the looped end of said wire positioned against an end of said capacitor section, a soldering head, means connected to said drive unit to move said soldering head into engagement with said capacitor section end, means connected to said power drive unit for feeding a measured amount of solder through said soldering head to between said soldering head and said capacitor section end, means connected to said power drive unit for rotating said jaw members while said soldering head is in engagement with said capacitor section end, means connected to said power drive unit for removing said soldering head from engagement with said capacitor section end after the rotation thereof, and means connected to said power drive unit for removing said soldered capacitor section from said jaw members.

10. A soldering machine comprising a power drive unit having a cycle of operation, a pair of jaw members, a supply source of capacitor sections, means connected to said power drive unit to release a capacitor section once for each said cycle of operation from said supply source, means connected to said power drive unit to insert said released capacitor section in said jaws, looping means connected to said power drive unit to form a loop on the end of a wire, wire feeding means connected to said drive unit to straighten and feed said wire a measured amount through said looping means once for each said cycle of operation, means connected to said power drive unit to shear said advanced looped wire and to carry said wire into adjacency with said capacitor section held by said jaw members with the looped end of said wire positioned against an end of said capacitor section, a soldering head having a notch adapted to embrace the shank of said positioned wire, means connected to said drive unit to move said soldering head into engagement with said capacitor section end, means connected to said power drive unit for feeding a measured amount of solder through said soldering head to between said soldering head and said capacitor section end, means connected to said power drive unit for rotating said jaw members while said soldering head is in engagement with said capacitor section end, means connected to said power drive unit for removing said soldering head from engagement with said capacitor section end after the rotation thereof, and means connected to said power drive unit for removing said soldered capacitor section from said jaw members.

11. A soldering machine comprising a power drive unit having a cycle of operation, a pair of jaw members, a supply source of capacitor sections, means connected to said power drive unit to release a capacitor section once for each said cycle of operation from said supply source, means connected to said power drive unit to insert said released capacitor section in said jaws, looping means connected to said power drive unit to form a loop on the end of a wire, wire feeding means connected to said drive unit to straighten and feed said wire a measured amount from a wire supply source through said looping means once for each said cycle of operation, means connected to said power drive unit to shear said advanced looped wire and to carry said wire into adjacency with said capacitor section held by said jaw members with the looped end of said wire positioned against an end of said capacitor section, a soldering head having a notch adapted to embrace the shank of said positioned wire, means connected to said drive unit to move said soldering head into engagement with said capacitor section end, means connected to said power drive unit for feeding a measured amount of solder through said soldering head to between said soldering head and said capacitor section end, means connected to said power drive unit for rotating said jaw members while said soldering head is in engagement with said capacitor section end, means connected to said power drive unit for removing said soldering head from engagement with said capacitor section end after the rotation thereof, means connected to said power drive unit for removing said soldered capacitor section from said jaw members, and means connected to said power drive unit for intermittently feeding solder through said soldering head when said soldering head is out of engagement with a capacitor section.

12. A wire feeding and straightening device comprising a fixed clamping member, a movable clamping member movable away from said fixed clamping member, means to actuate said movable member to grip a wire thereby as said movable member moves away from said fixed member, and means to actuate said fixed member to grip a wire thereby during movement of said movable member away from said fixed member.

13. A wire feeding and straightening device comprising a fixed member, a movable member mounted for reciprocal movement towards and away from said fixed member, said fixed and movable members each being adapted to grip a common wire, means for actuating said movable member to grip said wire thereby during movement of said movable member away from said fixed member and to release said wire during movement of said movable member towards said fixed member, and means to actuate said fixed member to release said wire thereby during the major portion of movement of said movable member away from said fixed member and to grip said wire thereby during the final portion of movement of said movable member away from said fixed member and during the movement of said movable member towards said fixed member.

14. A jaw rotating device comprising a frame having first and second pivot points thereon, first and second links pivotally connected to said first and second pivot points, respectively, a third link pivotally connected at one end thereof to said first link and intermediate its ends to said second link, a fourth link pivotally connected at one end thereof to said first link and intermediate its ends to said second link, said third and fourth links being each parallel to a line through said first and second pivot points, a fifth link pivotally connected at one end thereof to said third link and intermediate its ends to said fourth link, said first, second and fifth links being parallel, a clamping jaw means on the other end of said fifth link, said jaw means having a clamping center lying on a line extending through said first and second pivot points, and means to rotate said first link about said first pivot point.

15. A rotatable clamping device comprising a frame having first and second pivot points thereon, first and second links pivotally connected to said first and second pivot points, respectively, a third link pivotally connected at one end thereof to said first link and intermediate its ends to said second link, a fourth link pivotally connected at one end thereof to said first link and intermediate its ends to said second link, said third and fourth links being each parallel to a line through said first and second pivot points, a fifth link pivotally connected at one end thereof to said third link and intermediate its ends to said fourth link, said first, second and fifth links being parallel, a clamping jaw means on the other end of said fifth link, said jaw means having a clamping center lying on a line extending through said first and second pivot points, means to rotate said first link about said first pivot point, and means to open and close said jaw means.

16. A solder feed unit comprising a pair of feed rollers in tangential relation and adapted to grip a rod of solder therebetween, an intermittently reciprocating drive source having a constant stroke, means to rotate one of said feed rollers a fixed degree of rotation in response to movement of said drive source in one direction thereof, means to vary the degree of rotation of said one roller caused by said power drive source, and means to intermittently rotate the other of said feed rollers in response to movement of said drive source in the opposite direction thereof.

17. A solder feed unit comprising a pair of feed rollers in tangential relation and adapted to grip a rod of solder therebetween, an intermittently reciprocating drive source having a constant stroke, means to rotate one of said feed rollers a fixed degree of rotation in response to movement of said drive source in one direction thereof, means to vary the degree of rotation of said one roller caused by said power drive source, and means to rotate the other of said feed rollers in response to movement of said drive source in the opposite direction thereof after a predetermined number of revolutions of said other feed roller has occurred.

18. A solder feed unit comprising a feed roller adapted to frictionally engage a rod of solder to advance said solder upon rotation of said feed roller, a drive shaft connected through a one-way clutch to said feed roller, a lever freely rotatable on said drive shaft, a crank arm connected to said drive shaft, means to oscillate said lever a fixed amount about said drive shaft, a pivot point fixed with relation to said drive shaft, a first link pivotally connected to said lever, a second link pivotally connected to said crank arm, a third link pivotally connected to said fixed pivot point, said first, second and third links being connected at the other ends thereof to a common pivot point and said second and third links being equal in length whereby rotation of said lever in one direction will cause said roller to rotate through a fixed degree of rotation, and means to position said fixed pivot point in coaxial relation to said pivotal connection of said second link to said crank arm.

19. A solder feed unit comprising a feed roller, a drive shaft connected through a one-way clutch to said feed roller, a lever freely rotatable on said drive shaft, a crank arm connected to said drive shaft, means to oscillate said lever a fixed amount about said drive shaft, a pivot point fixed with relation to said drive shaft, a first link pivotally connected to said lever, a second link pivotally connected to said crank arm, a third link pivotally connected to said fixed pivot point, said first, second and third links being connected at the other ends thereof to a common pivot point and said second and third links being equal in length whereby rotation of said lever in one direction will cause said roller to rotate through a fixed degree of rotation, means to vary said fixed pivot point from a coaxial relation to said pivotal connection of said second link to said crank arm to a point remote therefrom, a second feed roller in tangential relation to said first feed roller, said first and second feed rollers being adapted to frictionally engage a rod of solder therebetween, a second drive shaft connected through a one-way clutch to said second feed roller, a crank arm on said second drive shaft, and means to latch said second drive shaft crank arm to said lever for movement thereby as said lever rotates in a direction opposite to said one direction thereof.

20. A solder feed unit comprising a feed roller, a drive shaft connected through a one-way clutch to said feed roller, a lever freely rotatable on said drive shaft, a crank arm connected to said drive shaft, means to oscillate said lever a fixed amount about said drive shaft, a pivot point fixed with relation to said drive shaft, a first link pivotally connected to said lever, a second link pivotally connected to said crank arm, a third link pivotally connected to said fixed pivot point, said first, second and third links being connected at the other ends thereof to a common pivot point and said second and third links being equal in length whereby rotation of said lever in one direction will cause said roller to rotate through a fixed degree of rotation, means to vary said fixed pivot point from a coaxial relation to said pivotal connection of said second link to said crank arm to a point remote therefrom, a second feed roller in tangential relation to said first feed roller, a second drive shaft connected through a one-way clutch to said second feed roller, a crank arm on said second drive shaft, means to latch said second drive shaft crank arm to said lever for movement thereby as said lever rotates in a direction opposite to said one direction thereof, and means to actuate said latching means after a predetermined amount of rotation of said second feed roller has occurred.

21. A soldering machine comprising means for gripping a capacitor section at a soldering station, means for positioning a pigtail lead having a looped end thereon adjacent one end of said capacitor section, a soldering head having a roughened soldering face movable into abutment with the end of said capacitor section, means for moving said soldering head to and from said soldering station, means to inject a quantity of solder between said soldering head and said capacitor section when said soldering face and capacitor are in abutment, and means to rotate said gripping means while said soldering head is in engagement with the end of said capacitor.

22. A soldering machine comprising means for gripping a capacitor section, means for actuating said gripping means and loading a capacitor at a loading station, means for moving said gripping means between said loading station and a soldering station, means for positioning a pigtail lead having a looped end thereon adjacent one end of said capacitor while said capacitor is gripped at the soldering station, a soldering head having a roughened soldering face movable into abutment with the end of said capacitor section, means for moving said soldering head to and from said soldering station, means to inject a quantity of solder between said soldering head and said capacitor section when said soldering face and capacitor are in abutment, means to rotate said gripping means while said soldering head is in engagement with the end of said capacitor, and means for actuating said gripping means and releasing said capacitor after said solder sufficiently cools.

23. A wire looping device comprising a die member having an axial passage therethrough for receiving a wire, means for bending said wire around said die member in a path generally concentric to said passage, a first shear member spaced axially of said die member and adapted for engaging a wire extending through said die member passage, a transfer member movable in a plane normal to said extending wire, said transfer member having a second shear member thereon cooperable with said first shear member to shear said extending wire, means for moving said transfer member from a first position across the path of said extending wire into a second position; and a holding lever to grip said extending wire against said transfer member after said second shear member engages said wire, whereby said extending wire is sheared and then transferred into said second position.

24. A wire looping device comprising a die member having an axial passage therethrough for receiving a wire, means for bending said wire around said die member in a path generally concentric to said passage, a first shear member spaced axially of said die member and adapted for engaging a wire extending through said die member passage, said first shear member being movable from a first position to a second position for engaging a wire extending axially outward from said die, a transfer member movable in a plane normal to said extending wire, said transfer member having a second shear member thereon cooperable with said first shear member to shear said extending wire, means for moving said transfer member from a first position across the path of said extending wire into a second position; means for actuating said first shear member from its said first position into its said second position upon actuation of said transfer member from its said first position, a holding lever to grip said extending wire against said transfer member after said second shear member engages said wire, whereby said extending wire is sheared and then transferred into said second position.

25. A wire looping device comprising a die member having an axial passage therethrough for receiving a wire, means for bending said wire around said die member in a path generally concentric to said passage, a first shear member spaced axially of said die member and adapted for engaging a wire extending through said die member passage, a transfer member movable in a plane normal to said extending wire, said transfer member having a second shear member thereon cooperable with said first shear member to shear said extending wire, means for moving said transfer member from a first position across the path of said extending wire into a second position; and a clamping means mounted on said transfer member, said clamping means being adapted for gripping said extending wire when sheared, whereby said wire is held by said clamping means as said transfer arm is moved into its said second position.

26. A wire looping device comprising a die member having an axial passage therethrough for receiving a wire, means for bending said wire around said die member in a path generally concentric to said passage, a first shear member spaced axially of said die member and adapted for engaging a wire extending through said die member passage, a transfer member movable in a plane normal to said extending wire, said transfer member having a second shear member thereon cooperable with said first shear member to shear said extending wire, means for moving said transfer member from a first position across the path of said extending wire into a second position; a holding lever to grip said extending wire against said transfer member after said second shear member engages said wire, whereby said extending wire is sheared and then transferred into said second position, and means to move a wire through said passage a distance greater than the axial distance between said die member and said first shear member when said transfer member is in its said first position.

27. A wire looping device comprising a die member having an axial passage therethrough for receiving a wire, means for bending said wire around said die member in a path generally concentric to said passage, a first shear member spaced axially of said die member and adapted for engaging a wire extending through said die member passage, said first shear member being movable from a first position to a second position for engaging a wire extending axially outward from said die, a transfer member movable in a plane normal to said extending wire, said transfer member having a second shear member thereon cooperable with said first shear member to shear said extending wire, means for moving said transfer member from a first position across the path of said extending wire into a second position, means for actuating said first shear member from its said first position into its said second position upon actuation of said transfer member from its said first position, a holding lever to grip said extending wire against said transfer member after said second shear member engages said wire, whereby said extending wire is sheared and then transferred into said second position, said holding lever having a cam follower positioned to engage said first shear member when said shear member occupies its said first position, whereby said holding lever is restrained from gripping said extended wire against said transfer member.

28. A wire looping device comprising a die member having an axial passage therethrough for receiving a wire, means for bending said wire around said die member in a path generally concentric to said passage, a first shear member spaced axially of said die member and adapted for engaging a wire extending through said die member passage, said first shear member being movable from a first position to a second position for engaging a wire extending axially outward from said die, a transfer member movable in a plane normal to said extending wire, said transfer member having a second shear member thereon cooperable with said first shear member to shear said extending wire, means for moving said transfer member from a first position across the path of said extending wire into a second position, means for actuating said first shear member from its said first position into its said second position upon actuation of said transfer member from its said first position, a clamping means mounted on said transfer member for gripping said extending wire, and means for actuating said clamping means to a gripping position upon actuation of said transfer member from its said first position.

29. A wire looping device comprising a die member having an axial passage therethrough to receive a wire therein and a groove across the end of said die member intersecting said passage, a blade member movable across the axis of said passage and adapted for bending said wire into said groove, a looping finger rotatably movable around said die member in a path generally concentric to said passage and adapted to engage said wire during said movement to bend said wire around said die member, means for imparting an oscillating movement to a power shaft, drive means including a friction clutch interconnecting said looping finger with said power shaft, a cam having a spiral camming surface and rotatably movable with said looping finger, a detent member biased into the path of said camming surface, and means for biasing said looping finger against the operative drive of said power shaft, whereby said looping finger is indexed to a starting position after each operative driving movement of said power shaft.

30. The wire looping device of claim 29 including a first shear member spaced axially of said die member and adapted for engaging a wire extending through said die member passage, said first shear member being movable from a first position to a second position for engaging a wire extending axially outward from said die, a transfer member movable in a plane normal to said extending wire, said transfer member having a second shear member thereon cooperable with said first shear member to shear said extending wire, means for moving said transfer member from a first position across the path of said extending wire into a second position; and a holding lever to grip said extending wire against said transfer member after said second shear member engages said wire, whereby said extending wire is sheared and then transferred into said second position.

31. A wire looping device comprising a die member having an axial passage therethrough to receive a wire therein and a groove across the end of said die member intersecting said passage, a blade member movable across the axis of said passage and adapted for bending said wire into said groove, a looping finger rotatably movable around said die member in a path generally concentric to said passage and adapted to engage said wire during said movement to bend said wire around said die member, means for imparting an oscillating movement to a power shaft, drive means including a friction clutch interconnecting said blame member and said looping finger with said power shaft, a cam having a spiral camming surface and rotatably movable with said looping finger, a detent member biased into the path of said camming surface, and means for biasing said blade and said looping finger against the operative drive of said power shaft, whereby said blade and looping finger are respectively indexed to starting positions after each operative driving movement of said power shaft.

32. In a soldering machine having means for retaining a capacitor section at a soldering station, and comprising means for forming a pigtail at the end of an extended wire, a first shear member adapted for engaging said extended wire, a pigtail lead transfer member movable in a plane normal to said extended wire, said transfer member having a second shear member thereon cooperable with said first shear member to shear said extended wire to form a pigtail lead, means for moving said transfer member from a first position across the path of said extended wire to said soldering station, a holding lever to grip said extended wire against said transfer member after said second shear member engages said wire, whereby said pigtail lead is transferred to said soldering station and held adjacent one end of said capacitor section, a soldering head having a soldering face movable into abutment with the end of said capacitor section, means for moving said soldering head to and from said soldering station, means to inject a quantity of solder between said soldering head and said capacitor section when said soldering face and capacitor are in abutment, and means for actuating said pigtail forming means, said transfer member, said soldering head and said injecting means in a synchronized cycle of operation, whereby a pigtail lead is assembled to a capacitor section for each complete cycle.

References Cited in the file of this patent

UNITED STATES PATENTS

| | | | |
|---|---|---|---|
| 1,626,652 | Whitmore et al. | May 3, | 1927 |
| 1,670,006 | Prym | May 15, | 1928 |
| 1,933,718 | Devincenzi | Nov. 7, | 1933 |
| 1,943,452 | Nolan | June 16, | 1934 |
| 2,067,521 | Danziger | Jan. 12, | 1937 |
| 2,230,818 | Stewart | Feb. 4, | 1941 |
| 2,285,872 | Pearson | June 9, | 1942 |
| 2,324,973 | Young | July 20, | 1943 |
| 2,419,484 | Danziger | Apr. 22, | 1947 |
| 2,628,585 | Cowles | Feb. 17, | 1953 |
| 2,698,081 | Rice | Dec. 28, | 1954 |
| 2,786,434 | Klungtvedt | Mar. 26, | 1957 |
| 2,934,098 | Strauss | Apr. 26, | 1960 |